US012741450B2

(12) United States Patent
Otani et al.

(10) Patent No.: US 12,741,450 B2
(45) Date of Patent: Sep. 22, 2026

(54) REFLECTIVE FILM, METHOD FOR PRODUCING LAMINATED GLASS, AND LAMINATED GLASS

(71) Applicant: FUJIFILM Corporation, Tokyo (JP)

(72) Inventors: Taketo Otani, Minamiashigara (JP); Takeshi Unemura, Minamiashigara (JP); Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 737 days.

(21) Appl. No.: 18/061,053

(22) Filed: Dec. 2, 2022

(65) Prior Publication Data

US 2023/0102484 A1 Mar. 30, 2023

Related U.S. Application Data

(63) Continuation of application No. PCT/JP2021/020839, filed on Jun. 1, 2021.

(30) Foreign Application Priority Data

Jun. 3, 2020 (JP) ................................ 2020-096782

(51) Int. Cl.
*B32B 17/00* (2006.01)
*B32B 1/00* (2006.01)
(Continued)

(52) U.S. Cl.
CPC .......... *B32B 17/10504* (2013.01); *B32B 1/00* (2013.01); *B32B 3/02* (2013.01);
(Continued)

(58) Field of Classification Search
CPC .. B32B 3/26; B32B 3/30; B32B 3/263; B32B 17/00; B32B 17/10005; B32B 17/10036;
(Continued)

(56) References Cited

U.S. PATENT DOCUMENTS

2012/0276374 A1* 11/2012 Hino ................ B32B 17/10005 156/99
2014/0192286 A1 7/2014 Tasaka et al.
(Continued)

FOREIGN PATENT DOCUMENTS

CA 1321865 C * 9/1993 ....... B32B 17/10761
CN 109863430 A 6/2019
(Continued)

OTHER PUBLICATIONS

Translation JP-2013/086987 (Year: 2013).*
(Continued)

*Primary Examiner* — Hoa (Holly) Le
(74) *Attorney, Agent, or Firm* — Birch, Stewart, Kolasch & Birch, LLP

(57) ABSTRACT

A laminated glass, a method for producing a laminated glass, and a reflective film that has end parts where the generation of wrinkles is prevented in a case where the laminated glass is produced by sandwiching the reflective film between two glass plates and that has a reflection wavelength range with a small variation are provided. The reflective film has wavelength-selective reflectivity. A thermal shrinkage rate in a case where the reflective film is held at 140° C. for 30 minutes is greater than 0.5% and smaller than 2.0%. The reflective film has at least one cutout portion on a side edge of the reflective film.

17 Claims, 5 Drawing Sheets

(51) Int. Cl.
*B32B 3/02* (2006.01)
*B32B 17/10* (2006.01)
*B32B 37/20* (2006.01)

(52) U.S. Cl.
CPC .. *B32B 17/10036* (2013.01); *B32B 17/10871* (2013.01); *B32B 37/203* (2013.01); *B32B 2250/03* (2013.01); *B32B 2250/40* (2013.01); *B32B 2305/55* (2013.01); *B32B 2307/416* (2013.01); *B32B 2307/736* (2013.01); *B32B 2315/08* (2013.01); *B32B 2398/00* (2013.01); *B32B 2457/20* (2013.01)

(58) Field of Classification Search
CPC ........ B32B 17/10293; B32B 17/10559; B32B 2305/55; B32B 2307/416; B32B 2307/734; B32B 2307/736
See application file for complete search history.

(56) References Cited

U.S. PATENT DOCUMENTS

| | | | |
|---|---|---|---|
| 2015/0107523 | A1 | 4/2015 | Nakata et al. |
| 2017/0254936 | A1 | 9/2017 | Morita |
| 2018/0009294 | A1 | 1/2018 | Yamakawa et al. |
| 2019/0091974 | A1* | 3/2019 | Takahashi .................. B60J 1/00 |
| 2019/0235243 | A1 | 8/2019 | Anzai et al. |
| 2020/0114624 | A1* | 4/2020 | Mannheim Astete ....................... B32B 17/10036 |
| 2021/0039357 | A1* | 2/2021 | Nakamura ........ B32B 17/10449 |
| 2021/0187914 | A1* | 6/2021 | Nakayama ........ B32B 17/10761 |

FOREIGN PATENT DOCUMENTS

| | | | | | |
|---|---|---|---|---|---|
| CN | 112456811 | B | * | 5/2022 | ............ B32B 27/40 |
| JP | S6328196 | Y2 | * | 7/1988 | |
| JP | 8-240757 | A | | 9/1996 | |
| JP | 2001-47463 | A | | 2/2001 | |
| JP | 2005-55553 | A | | 3/2005 | |
| JP | 2013-14710 | A | | 1/2013 | |
| JP | 2013-76052 | A | | 4/2013 | |
| JP | 2013-86987 | A | | 5/2013 | |
| JP | 2013086987 | A | * | 5/2013 | ....... B32B 17/10036 |
| JP | 2016064974 | A | * | 4/2016 | |
| JP | 2017-14367 | A | | 1/2017 | |
| JP | 2017-105665 | A | | 6/2017 | |
| JP | 2018-2567 | A | | 1/2018 | |
| JP | 3219270 | U | | 12/2018 | |
| TH | 2101007718 | A | * | 8/2022 | |
| WO | WO 2010/093023 | A1 | | 8/2010 | |
| WO | WO-2012050078 | A1 | * | 4/2012 | ....... B32B 17/10633 |
| WO | WO 2014/122696 | A1 | | 8/2014 | |
| WO | WO 2015/056594 | A1 | | 4/2015 | |
| WO | WO 2016/027733 | A1 | | 2/2016 | |
| WO | WO-2019203141 | A1 | * | 10/2019 | ............ G02B 5/282 |

OTHER PUBLICATIONS

Translation WO 2010093023 A1 (Year: 2010).*
Translation JP S6328196 Y2.*
Translation TH 2101007718 A (Year: 2022).*
Translation JP 2016064974 A (Year: 2016).*
Japanese Office Action for corresponding Japanese Application No. 2022-528844, dated Dec. 12, 2023, with English translation.
International Preliminary Report on Patentability and Written Opinion of the International Searching Authority (Forms PCT/IB/326, PCT/IB/373, and PCT/ISA/237) for International Application No. PCT/JP2021/020839, dated Dec. 15, 2022, with an English translation.
International Search Report (Form PCT/ISA/210) for International Application No. PCT/JP2021/020839, dated Aug. 24, 2021, with an English translation.
Extended European Search Report for corresponding European Application No. 21817329.2, dated Nov. 9, 2023.
Chinese Office Action and Search Report for corresponding Chinese Application No. 202180038509.3, dated Aug. 11, 2025, with English translation.
Chinese Office Action for corresponding Chinese Application No. 202180038509.3, dated Dec. 24, 2025, with English translation.

* cited by examiner

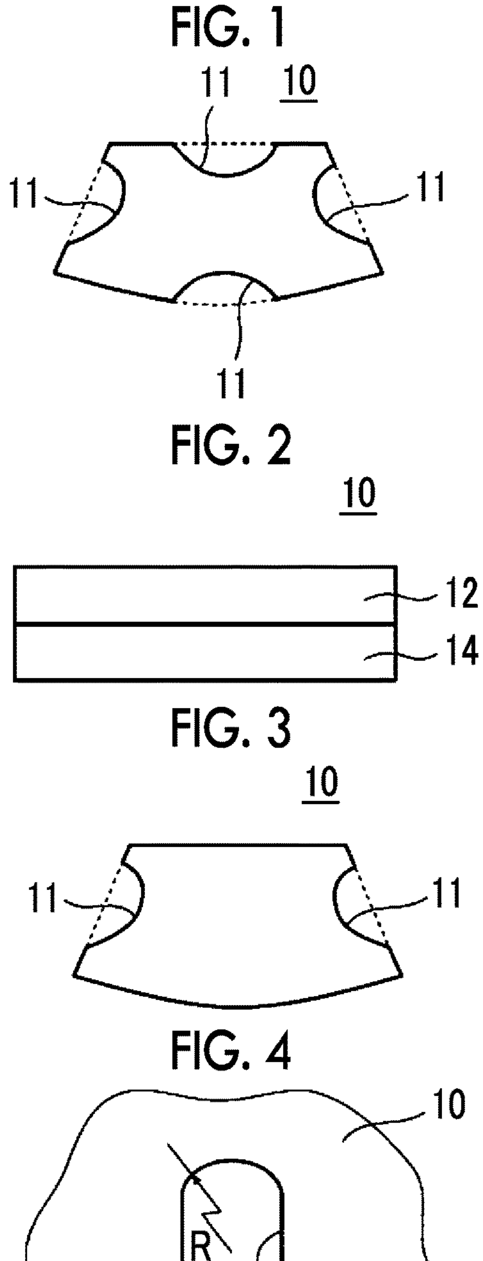
FIG. 1
11
10
11
11
11
FIG. 2
10
12
14
FIG. 3
10
11
11
FIG. 4
10
R
11
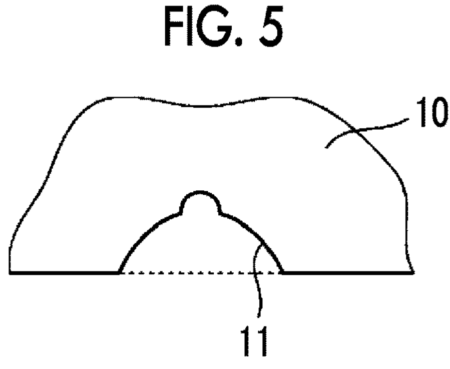
FIG. 5
10
11

FIG. 6
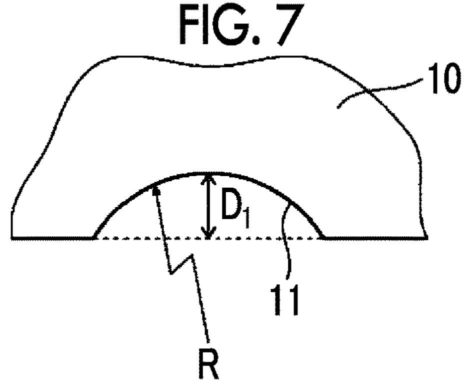
FIG. 7
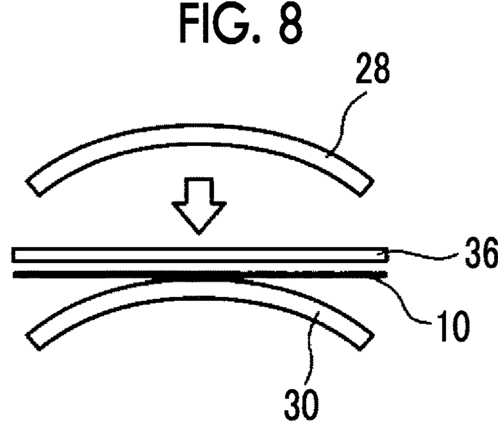
FIG. 8
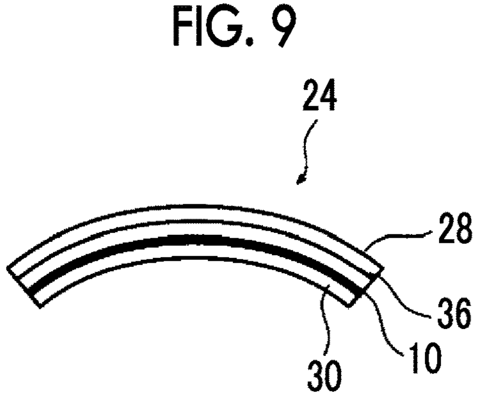
FIG. 9

REFLECTIVE FILM, METHOD FOR PRODUCING LAMINATED GLASS, AND LAMINATED GLASS

CROSS-REFERENCE TO RELATED APPLICATIONS

This application is a Continuation of PCT International Application No. PCT/JP2021/020839 filed on Jun. 1, 2021, which claims priority under 35 U.S.C. § 119(a) to Japanese Patent Application No. 2020-096782 filed on Jun. 3, 2020. The above application is hereby expressly incorporated by reference, in its entirety, into the present application.

BACKGROUND OF THE INVENTION

1. Field of the Invention

The present invention relates to a reflective film that can be used as a combiner in a head-up display system, a method for producing a laminated glass including this reflective film, and a laminated glass.

2. Description of the Related Art

Recently, it is known as a so-called head-up display or a head-up display system for providing various pieces of information such as maps, traveling speed, or vehicle conditions to a driver by projecting images on a windshield glass of a vehicle or the like.

The head-up display system can be configured to use, as a windshield glass, a laminated glass formed with two glass plates and a half-mirror film (reflective film) that is sandwiched between the two glass plates.

A windshield glass of a vehicle or the like is curved in a three-dimensional shape. Therefore, a reflective film is disposed between two glass plates curved in a three-dimensional shape, and the two glass plates are thermocompression bonded to produce a laminated glass used as a windshield glass. However, the reflective film has a flat shape, while the glass plates have a three-dimensional shape. Thus, there were problems that the reflective film cannot follow the curved shape of the glass plates, and wrinkles occur in the reflective film.

In order to solve these problems, it has been proposed to set a thermal shrinkage rate of the reflective film within a predetermined range to prevent the generation of wrinkles.

For example, it is disclosed in JP2013-086987A that a laminated glass includes a resin film sandwiched between a first glass substrate and a second glass substrate with an adhesive layer, and a substantially annular hiding portion near an outer periphery, in which the resin film has a thermal shrinkage rate of greater than 1% and smaller than 2% in a direction in which the thermal shrinkage rate is maximum, and a thermal shrinkage rate of greater than 1% and smaller than 2% in a direction orthogonal to the direction, and a cut edge of the resin film is arranged with respect to an inner periphery of the hiding portion within a range of 10 mm in each of a direction of the cut edge of the laminated glass and a direction opposite thereto when the laminated glass is viewed from the front.

SUMMARY OF THE INVENTION

In recent years, the demand performance for laminated glass has been increasing, and it is demanded to further prevent the generation of wrinkles at end parts of a reflective film. However, according to the studies of the present inventors, it has been found that the generation of wrinkles at the end parts of the reflective film cannot be sufficiently prevented only by setting the thermal shrinkage rate of the reflective film to a predetermined range. In particular, in a case where the curvature of a glass plate is large, the generation of wrinkles cannot be sufficiently prevented only by setting the thermal shrinkage rate of the reflective film within a predetermined range.

Increasing of the thermal shrinkage rate of the reflective film makes easier to prevent the generation of wrinkles at the end parts of the reflective film. However, in a case of using a reflective film having wavelength-selective reflectivity, which is a property of reflecting light in a specific wavelength range and transmitting light in other wavelength ranges, as the reflective film, the thickness of the reflective film varies in a case where the thermal shrinkage rate of the reflective film is too high, which causes variation in a reflection wavelength range. Therefore, a reflectivity at a predetermined wavelength is lowered, and a tint is changed.

An object of the present invention is to solve such problems, and is to provide a laminated glass, a method for producing a laminated glass, and a reflective film that has end parts where the generation of wrinkles is prevented in a case where the laminated glass is produced by sandwiching the reflective film between two glass plates, and that has a reflection wavelength range with a small variation.

[1] A reflective film having wavelength-selective reflectivity, in which an average thermal shrinkage rate in a case where the reflective film is held at 140° C. for 30 minutes is greater than 0.5% and smaller than 2.5%, and the reflective film has at least one cutout portion on a side edge of the reflective film.

[2] The reflective film according to [1], in which the reflective film has a plurality of the cutout portions.

[3] The reflective film according to [1] or [2], in which the cutout portion has a curved portion, and a minimum curvature radius of the curved portion is 100 mm or greater and 1700 mm or smaller.

[4] The reflective film according to [3], in which the minimum curvature radius of the curved portion is 100 mm or greater and 900 mm or smaller.

[5] The reflective film according to [3] or [4], in which the minimum curvature radius of the curved portion is 100 mm or greater and 700 mm or smaller.

[6] The reflective film according to any one of [3] to [5], in which the minimum curvature radius of the curved portion is 100 mm or greater and 500 mm or smaller.

[7] The reflective film according to any one of [3] to [6], in which the minimum curvature radius of the curved portion is 100 mm or greater and 300 mm or smaller.

[8] The reflective film according to any one of [1] to [7], in which a depth $D_1$ of the cutout portion is 10 mm to 250 mm.

[9] The reflective film according to any one of [1] to [8], comprising:

a substrate; and a reflective layer disposed on one main surface side of the substrate.

[10] The reflective film according to [9], in which the reflective layer is a cholesteric liquid crystal layer.

[11] The reflective film according to [9] or [10], in which the reflective layer has a selective reflection center wavelength in a wavelength range from visible light to infrared light.

[12] A method for producing a laminated glass comprising:

disposing the reflective film according to any one of [1] to [11] between two glass plates; and performing a thermocompression bonding treatment on the two glass plates to produce a laminated glass.

[13] The method for producing a laminated glass according to [12], in which the reflective film is disposed at a position within 100 mm from each of edge sides of the glass plates to perform the thermocompression bonding treatment.

[14] The method for producing a laminated glass according to [12] or [13], in which each of the two glass plates has a maximum curvature depth of 15 mm or greater.

[15] A laminated glass comprising:

two glass plates; and a reflective film disposed between the two glass plates, in which the reflective film has wavelength-selective reflectivity, and the reflective film has at least one cutout portion on a side edge.

[16] The laminated glass according to [15], in which each of the two glass plates has a maximum curvature depth of 15 mm or greater.

According to the present invention, it is possible to provide the laminated glass, the method for producing a laminated glass, and the reflective film that has end parts where the generation of wrinkles can be prevented in a case where the laminated glass is produced by sandwiching the reflective film between two glass plates, and that has a reflection wavelength range with a small variation.

BRIEF DESCRIPTION OF THE DRAWINGS

FIG. 1 is a top view schematically illustrating an example of a reflective film of the present invention.

FIG. 2 is a cross-sectional view schematically illustrating an example of the reflective film of the present invention.

FIG. 3 is a top view schematically illustrating another example of the reflective film of the present invention.

FIG. 4 is a partially enlarged view illustrating an example of another shape of the cutout portion.

FIG. 5 is a partially enlarged view illustrating an example of still another shape of the cutout portion.

FIG. 6 is a partially enlarged view illustrating an example of the other shape of the cutout portion.

FIG. 7 is a partially enlarged view for explaining a shape of the cutout portion.

FIG. 8 is a conceptual diagram illustrating a method for producing a laminated glass of the present invention.

FIG. 9 is a conceptual diagram illustrating the method for producing a laminated glass of the present invention.

DESCRIPTION OF THE PREFERRED EMBODIMENTS

Figure 10:
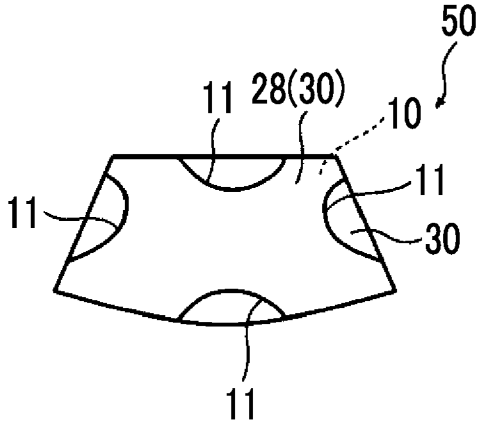
FIG. 10 is a top view schematically illustrating an example of the laminated glass produced by the method for producing a laminated glass of the present invention.

A reflective film, a method for producing a laminated glass, and a laminated glass of the present invention will be described in detail below based on suitable embodiments illustrated in the accompanying drawings.

The figures described below are exemplary for explaining the present invention, and the present invention is not limited to the figures illustrated below.

In the following, "~" indicating the numerical range includes the numerical values described on both sides. For example, $\varepsilon_1$ is the numerical value $\alpha_1$ to the numerical value $\beta_1$ means that the range of $\varepsilon_1$ includes the numerical value $\alpha_1$ and the numerical value $\beta_1$, and in a case of being indicated by mathematical signs, $\alpha_1 \leq \varepsilon_1 \leq \beta_1$.

Angles such as "angles represented by specific numerical values", "parallel", "vertical", and "orthogonal" include error ranges generally tolerated in the art, unless otherwise described.

The term "the same" includes an error range generally tolerated in the art, and an "entire surface" and the like also include error ranges generally tolerated in the art.

"Light" means light of visible light and natural light (unpolarization), unless otherwise specified. The visible light is light at a wavelength which is visible to the human eyes, among electromagnetic waves, and is normally light in a wavelength range of 380 to 780 nm. Invisible light is light in a wavelength range of smaller than 380 nm or in a wavelength range of greater than 780 nm.

Although light is not limited thereto, among the visible light, the light in a wavelength range of 420 to 490 nm is blue (B) light, and the light in a wavelength range of 495 to 570 nm is green (G) light, the light in a wavelength range of 620 to 750 nm is red (R) light.

The term "visible light transmittance" is a visible light transmittance of an A light source defined in JIS (Japanese Industrial Standards) R 3212:2015 (Test methods of safety glazing materials for road vehicles). That is, the transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average.

In a case of being simply referred to as "reflected light" or "transmitted light", the "reflected light" and "transmitted light" include the meanings of "scattered light" and "diffracted light", respectively.

The term "projection image" means an image based on projection of light from a projector to be used, which is not a scenery viewed from the driver's position such as the driver's field. The projection image is observed as a virtual image which is observed by an observer as the projection image is floated over a reflective film of the windshield glass.

The term "screen image" means an image displayed on a drawing device of a projector or an image drawn on an intermediate image screen or the like by a drawing device. Unlike a virtual image, the screen image is a real image.

Both the screen image and the projection image may be monochrome images, multicolor images of two or more colors, or full color images.

[Reflective Film]

The reflective film according to an embodiment of the present invention is a reflective film having wavelength-selective reflectivity, in which an average thermal shrinkage rate in a case where the reflective film is held at 140° C. for 30 minutes is greater than 0.5% and smaller than 2.5%, and the reflective film has at least one cutout portion on a side edge of the reflective film.

FIG. 1 is a top view schematically illustrating an example of the reflective film according to the embodiment of the present invention. A reflective film 10 illustrated in FIG. 1 has four cutout portions 11 on side edges. Since the reflective film 10 illustrated in FIG. 1 is incorporated into a laminated glass used as a windshield glass, the reflective film 10 has a substantially trapezoidal shape with a base convexly curved outward according to a shape of the windshield glass, and has the cutout portions 11 that are formed by cutting out the side edges of this substantially trapezoidal shape. In the illustrated example, the reflective film 10 has cutout portions 11 on four sides, respectively. The cutout portion 11 has a convexly curved shape toward the inside of the reflective film 10. Each of the cutout portion 11 is disposed substantially on the center of each side.

Here, the reflective film 10 has an average thermal shrinkage rate of greater than 0.5% and smaller than 2.5% when held at 140° C. for 30 minutes.

In addition, the reflective film 10 has wavelength-selective reflectivity. As an example, the reflective film 10 includes a reflective layer 12 made of a cholesteric liquid crystal layer having wavelength-selective reflectivity, and a support 14 that supports the reflective layer 12, as illustrated in FIG. 2.

The reflective film according to the embodiment of the present invention is configured to have an average thermal shrinkage rate within the above-mentioned range and to have the cutout portions on the side edges. As a result, in a case where the reflective film is disposed between two glass plates that are curved in a three-dimensional shape, and thermocompression bonding is performed on the two glass plates to produce the laminated glass, it is possible to prevent the generation of wrinkles at the end parts of the reflective film, and prevent a thickness of the reflective film from varying, thereby preventing variation in a reflection wavelength range.

The action of the reflective film will be detailed later.

Here, the average thermal shrinkage rate of the reflective film when held at 140° C. for 30 minutes is measured as follows.

Striped test pieces are each cut out from the reflective film along an arbitrary first direction, and along each of directions of 45°, 90°, and 135° with respect to the first direction. The test pieces each have, for example, a length of 150 mm×a width of 20 mm. A pair of reference lines is drawn on each test piece at intervals of about 100 mm in the longitudinal direction, and a length L between the reference lines is measured. The length L before heating is $L_1$.

Next, the test pieces are suspended vertically in a hot air circulating oven, heated to 140° C., held for 30 minutes, naturally cooled to room temperature, held for 60 minutes, and then each length L is measured again. The length L after heating is $L_2$. From the obtained lengths $L_1$ and $L_2$, the thermal shrinkage rate is calculated by the following Expression.

$$\text{Thermal shrinkage rate}=((L_1-L_2)/L_1)\times 100[\%]$$

Thermal shrinkage rates are obtained from the test pieces cut out along the first direction and the directions of 45°, 90°, and 135° with respect to the first direction, and are averaged to obtain an average thermal shrinkage rate of the reflective film.

From the viewpoint of suitably preventing the generation of wrinkles, the average thermal shrinkage rate of the reflective film is preferably 0.55% or greater, more preferably 0.6% or greater, and still more preferably 0.7% or greater.

On the other hand, from the viewpoint of preventing variation in the reflection wavelength range, the average thermal shrinkage rate of the reflective film is preferably 2.45% or smaller, more preferably 2.0% or smaller, and still more preferably 1.5 or less.

In addition, in the example illustrated in FIG. 1, the reflective film 10 is configured to have the cutout portions 11 on the four sides, respectively, but the present invention is not limited thereto, and the reflective film may have at least one cutout portion. For example, as illustrated in FIG. 3, the cutout portions 11 may be configured to be provided respectively on two sides that face each other. Also, two or more cutout portions may be provided on one side.

In addition, in the example illustrated in FIG. 1, a shape of each of the cutout portions 11 is an arc shape with a constant curvature radius, but the shape is not limited thereto. For example, as an example illustrated in FIG. 4, a shape of one cutout portions 11 may be a shape in which the curvature radius varies depending on positions. The cutout portion 11 in the example illustrated in FIG. 4 has a substantially rectangular shape and a convexly curved shape in which the center side of the reflective film is convexly curved toward the center. In the present invention, a straight side is considered to have an infinite curvature radius. In addition, as illustrated in FIG. 5, a shape of one cutout portion 11 may be a shape formed by combining a plurality of arc-shaped cutouts. The cutout portion 11 in the example illustrated in FIG. 5 has a shape in which a cutout having a predetermined curvature radius is provided, and a cutout having a smaller curvature radius than the cutout having a predetermined curvature radius is provided at a substantially central position of the cutout having a predetermined curvature radius.

In addition, as an example illustrated in FIG. 6, one cutout portion 11 may be provided on an entire side.

A minimum curvature radius R (see FIG. 7) of one cutout portion 11 is preferably 100 mm or greater, more preferably 150 mm or greater, and still more preferably 200 mm or greater. In addition, the minimum curvature radius R of the cutout portion 11 is preferably 1700 mm or smaller, more preferably 1200 mm or smaller, still more preferably 1000 mm or smaller, and the minimum curvature radius R is particularly preferable, in the following order, 900 mm or smaller, 700 mm or smaller, 500 mm or smaller, and 300 mm or smaller. In a case where the minimum curvature radius of the cutout portion 11 is too small, strain concentration occurs on the portion of a film, which may cause wrinkles. Therefore, it is preferable that the minimum curvature radius R of the cutout portion 11 is 100 mm or greater. On the other hand, in a case where the minimum curvature radius of the cutout portion 11 is too large, a ratio of an area of the reflective film to an area of the laminated glass is small in a case where the reflective film is incorporated into the laminated glass. In addition, a boundary portion of the reflective film is easily visually recognized, which may impair the appearance. Therefore, the minimum curvature radius R of the cutout portion 11 is preferably 1700 mm or smaller.

Here, assuming that a depth of the cutout portion 11 is $D_1$ as illustrated in FIG. 7, the depth $D_1$ of the cutout portion is preferably 10 mm to 250 mm, more preferably 30 mm to 230 mm, and still more preferably 50 mm to 200 mm.

By setting the depth $D_1$ of the cutout portion within the above-mentioned range, it is possible to more suitably prevent the generation of wrinkles while securing the area of the reflective film.

The depth $D_1$ of the cutout portion is the maximum value of a distance between a straight line and the cutout portion in a direction orthogonal to the straight line that connects two points at which the cutout portion is in contact with the side where this cutout portion is disposed.

The reflection wavelength range of the reflective film is not particularly limited, but it is preferably a partial range of at least one of visible light or infrared light. That is, it is preferable that the selective reflection center wavelength of the reflective film is present in the wavelength range from visible light to infrared light. For example, in a case where the reflective film is configured to include the reflective layer 12 made of a cholesteric liquid crystal layer as illustrated in FIG. 2, the selective reflection center wavelength of the cholesteric liquid crystal layer is preferably present in the wavelength range from visible light to infrared light. In addition, in a case where the reflective film is incorporated into a head-up display system, the reflective film preferably has reflection characteristics with respect to visible light emitted from a projector.

Here, in a case where the reflective film is configured to include the reflective layer 12 made of a cholesteric liquid crystal layer and the support 14 as illustrated in FIG. 2, a stretched film is often used as the support 14 in most cases. Since the stretched film has residual stress, thermal shrinkage occurs due to the residual stress of the support 14. Therefore, the residual stress of the support 14 can be adjusted to adjust the thermal shrinkage rate to be within the above-mentioned range.

In addition, a dielectric multi-layer film can be used as a reflective film having wavelength-selective reflectivity. As is well known, a dielectric multi-layer film has a structure in which a transparent film with a high refractive index and a transparent film with a low refractive index are alternately laminated. Thus, the adjustment of a layer structure enables the dielectric multi-layer film to reflect light in a desired wavelength range and to transmit light in other wavelength range. Even in a case where the reflective film is a dielectric multi-layer film, the reflective film may have a support that supports the dielectric multi-layer film. In this case, the thermal shrinkage rate can be adjusted within the above-mentioned range by adjusting a residual stress of the support. In addition, in a case where each layer in the dielectric multi-layer film is made of a polymer, the thermal shrinkage rate can also be adjusted by a residual stress of the dielectric multi-layer film itself.

<Support>

The support is a member that supports the reflective layer. The support is preferably transparent in the visible light region.

Materials for forming the support are not limited. Examples of the support include plastic films of polyester such as polyethylene terephthalate (PET), polycarbonate, an acrylic resin, an epoxy resin, polyurethane, polyamide, polyolefin, cellulose derivative, and silicone.

A thickness of the support may be approximately 5.0 to 1000 μm, is preferably 10 to 250 μm, and is more preferably 15 to 90 μm.

<Reflective Layer>

The reflective layer having wavelength-selective reflectivity is not particularly limited, and known reflective layers such as a cholesteric liquid crystal layer and a dielectric multi-layer film can be used.

<<Cholesteric Liquid Crystal Layer>>

A cholesteric liquid crystal layer is a layer in which a helical alignment structure (helical structure) of a liquid crystal compound is immobilized, and means a layer in which a cholesteric liquid crystalline phase is immobilized.

The cholesteric liquid crystal layer may be any layer as long as the alignment of a liquid crystal compound serving as a cholesteric liquid crystalline phase is maintained. The cholesteric liquid crystal layer may be typically a layer in which the polymerizable liquid crystal compound may be brought into the alignment state of a cholesteric liquid crystalline phase and polymerized and cured by ultraviolet light irradiation, heating, and the like to form a layer that has no fluidity and also whose alignment state is not changed by an external field or an external force. In the cholesteric liquid crystal layer, optical properties of the cholesteric liquid crystalline phase may be maintained in the layer, and the liquid crystal compound in the layer may not exhibit liquid crystal properties. For example, the polymerizable liquid crystal compound may have high molecular weight due to a curing reaction and lose liquid crystal properties.

A center wavelength λ of selective reflection (selective reflection center wavelength) λ due to the cholesteric liquid crystal layer depends on a pitch P (=helical cycle) of a helical structure (helical alignment structure) in a cholesteric liquid crystalline phase, and is based on a relationship between an average refractive index n of the cholesteric liquid crystal layer and $\lambda = n \times P$. As is clear from the above Expression, the selective reflection center wavelength can be adjusted by adjusting the n value and/or the P value.

In other words, the pitch P (one pitch of a helix) of the helical structure is the length in the helical axial direction for one turn of a helix, that is the length in the helical axial direction in which a director (in the case of a rod-shaped liquid crystal, the long axis direction) of the liquid crystal compound that constitutes the cholesteric liquid crystalline phase is rotated by 360°. The helical axial direction of the normal cholesteric liquid crystal layer coincides with a thickness direction of the cholesteric liquid crystal layer.

As an example, the selective reflection center wavelength and a half-width of the cholesteric liquid crystal layer can be obtained as follows.

In a case where the reflection spectrum of the cholesteric liquid crystal layer is measured from a normal direction using a spectrophotometer (manufactured by JASCO Corporation, V-670), a peak having a decreased transmittance is observed in the selective reflection region. Among the two wavelengths that are intermediate (average) transmittance between a minimum transmittance of the peak and a transmittance before the peak transmittance is reduced, assuming that a wavelength value of a shorter wavelength side is set $\lambda_1$ (nm) and a wavelength value of a longer wavelength side is set $\lambda_h$ (nm), the selective reflection center wavelength $\lambda$ and the half-width $\Delta\lambda$ can be expressed by the following expression.

$$\lambda=(\lambda_1+\lambda_h)/2$$

$$\Delta\lambda=(\lambda_h-\lambda_1)$$

The selective reflection center wavelength which is obtained as mentioned above substantially coincides with a wavelength at the center of gravity of reflection peak of circular polarization reflection spectra measured in the normal direction of the cholesteric liquid crystal layer.

The helical pitch of the cholesteric liquid crystalline phase depends on a type of chiral agents used together with the polymerizable liquid crystal compound and the addition concentration thereof, and thus, a desired pitch can be obtained by adjusting the type and the addition concentration. As a method of measuring helical sense and pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

(Method for Producing Cholesteric Liquid Crystal Layer)

Hereinafter, manufacturing materials and a producing method of the cholesteric liquid crystal layer will be described.

As a material used for formation of the cholesteric liquid crystal layer, a liquid crystal composition including a polymerizable liquid crystal compound and a chiral agent (optically active compound) is used. The liquid crystal composition obtained by further mixing a surfactant, a polymerization initiator, or the like, and dissolving in a solvent or the like, as necessary, is applied to a support, an alignment layer, and a cholesteric liquid crystal layer to serve as an underlayer. After cholesteric alignment is matured, the alignment can be fixed by curing the liquid crystal composition to form a cholesteric liquid crystal layer.

(Polymerizable Liquid Crystal Compound)

The polymerizable liquid crystal compound may be a rod-shaped liquid crystal compound or may be a disk-shaped liquid crystal compound.

As an example of the rod-shaped polymerizable liquid crystal compound for forming the cholesteric liquid crystal layer, a rod-shaped nematic liquid crystal compound is used. As the rod-shaped nematic liquid crystal compound, an azomethine compound, an azoxy compound, a cyanobiphenyl compound, a cyanophenyl ester compound, a benzoate compound, a phenylester cyclohexanecarboxylate compound, a cyanophenylcyclohexane compound, a cyano-substituted phenylpyrimidine compound, an alkoxy-substituted phenylpyrimidine compound, a phenyldioxane compound, a tolane compound, or an alkenylcyclohexylbenzonitrile compound is preferably used. Not only a low-molecular liquid crystal compound, but also a high-molecular liquid crystal compound can be used.

The polymerizable liquid crystal compound can be obtained by introducing a polymerizable group into the liquid crystal compound. The examples of a polymerizable group include an unsaturated polymerizable group, an epoxy group, an aziridinyl group, and an unsaturated polymerizable group is preferable, and an ethylenically unsaturated polymerizable group is particularly preferable. The polymerizable group can be introduced into the molecules of the liquid crystal compound using various methods. The number of polymerizable groups having the polymerizable liquid crystal compound is preferably 1 to 6 and more preferably 1 to 3 per molecule.

Examples of the polymerizable liquid crystal compound include compounds disclosed in Makromol. Chem., vol. 190, pp. 2255 (1989), Advanced Materials, vol. 5, pp. 107 (1993), U.S. Pat. Nos. 4,683,327A, 5,622,648A, 5,770,107A, WO95/022586A, WO95/024455A, WO97/000600A, WO98/023580A, WO98/052905, JP1989-272551A (JP-H01-272551A), JP1994-016616A (JP-H06-016616A), JP1995-110469A (JP-H07-110469A), JP1999-080081A (JP-H11-080081A), JP2001-328973A, and the like. Two or more kinds of the polymerizable liquid crystal compounds may be used in combination. In a case where two or more kinds of the polymerizable liquid crystal compounds are used in combination, the alignment temperature can be decreased.

The amount of polymerizable liquid crystal compound added into the liquid crystal composition is preferably 80% to 99.9% by mass, more preferably 85% to 99.5% by mass, and particularly preferably 90% to 99% by mass with respect to the mass of solid contents (the mass excluding a solvent) in the liquid crystal composition.

(Chiral Agent: Optically Active Compound)

The chiral agent has a function of causing a helical structure of a cholesteric liquid crystalline phase to be induced. Since the induced sense or pitch of the helix is different depending on the compounds, the chiral compound may be selected according to the purpose.

The chiral agent is not particularly limited and known compounds can be used. Examples of chiral agents include compounds described in Liquid Crystal Device Handbooks (Chapter 3, 4-3, Chiral Agents for TN and STN, p. 199, edited by Japan Society for the Promotion of Science, 142 Committee, 1989), JP2003-287623A, JP2002-302487A, JP2002-080478A, JP2002-080851A, JP2010-181852, or JP2014-034581A.

The chiral agent normally includes asymmetric carbon atoms, but an axially asymmetric compound or a plane asymmetric compound not including asymmetric carbon atoms can also be used as the chiral agent. Examples of the axially asymmetric compound or the plane asymmetric compound include binaphthyl, helicene, paracyclophane, and derivatives thereof.

The chiral agent may include a polymerizable group. In a case where both the chiral agent and the liquid crystal compound have a polymerizable group, a polymer that includes a repeating unit derived from the polymerizable liquid crystal compound and a repeating unit derived from the chiral agent can be formed by a polymerization reaction of a polymerizable chiral agent and the polymerizable liquid crystal compound. In this aspect, the polymerizable group of the polymerizable chiral agent is preferably the same group as the polymerizable group of the polymerizable liquid crystal compound. Accordingly, examples of a polymerizable group of the chiral agent preferably include an unsaturated polymerizable group, an epoxy group, and an aziridinyl group, an unsaturated polymerizable group is more preferable, and an ethylenically unsaturated polymerizable group is particularly preferable.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 manufactured by BASF SE may be used.

A content of the chiral agent in the liquid crystal composition is preferably 0.01% to 200% by mol and more preferably 1% to 30% by mol, with respect to the amount of the polymerizable liquid crystal compound. A content of the chiral agent in the liquid crystal composition is intended to be the concentration (% by mass) of the chiral agent with respect to the total solid content in the liquid crystal composition.

(Polymerization Initiator)

The liquid crystal composition preferably includes a polymerization initiator. In an aspect of allowing a polymerization reaction with ultraviolet light irradiation, the polymerization initiator used is preferably a photopolymerization initiator capable of starting a polymerization reaction with ultraviolet light irradiation.

Examples of the photopolymerization initiator include a-carbonyl compounds (described in each specification of U.S. Pat. Nos. 2,367,661B and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and a p-aminophenylketone (described in U.S. Pat. No. 3,549,367A), acridine and phenazine compounds (described in JP1985-105667A (JP-560-105667A), U.S. Pat. No. 4,239,850A), acylphosphine oxide compounds (described in JP1988-040799B (JP-563-040799B), JP1993-029234B (JP-H5-029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, JP2014-500852), oxime compounds (described in JP2000-066385A and JP4454067B), and oxadiazole compounds (described in U.S. Pat. No. 4,212,970A), and the like. For example, the description of paragraphs 0500 to 0547 of JP2012-208494A can also be referred to.

As the polymerization initiator, it is also preferable to use the acylphosphine oxide compounds or the oxime compounds.

As the acylphosphine oxide compounds, for example, IRGACURE 810 (compound name: bis(2,4,6-trimethylbenzoyl)-phenylphosphine oxide) which is a commercially available product and manufactured by BASF Japan Ltd. can be used. As examples of the oxime compounds, IRGACURE OXE 01 (manufactured by BASF SE), IRGACURE OXE 02 (manufactured by BASF SE), TR-PBG-304 (manufactured by Changzhou Tronly Advanced Electronic Materials Co., Ltd.), Adeka Arkls NCI-930 (manufactured by ADEKA CORPORATION), Adeka Arkls NCI-831 (manufactured by ADEKA CORPORATION), and the like, which are commercially available products, can be used.

The polymerization initiator may be used singly or in combination of two or more kinds thereof.

A content of the photopolymerization initiator in the liquid crystal composition is preferably 0.1% to 20% by mass and more preferably 0.5% to 5% by mass, with respect to a content of the polymerizable liquid crystal compound.

(Crosslinking Agent)

In order to improve a film hardness after curing and to improve durability, the liquid crystal composition may include any crosslinking agent. The crosslinking agent which is cured with ultraviolet light, heat, or moisture can be suitably used.

The crosslinking agent is not particularly limited, and can be appropriately selected according to the purpose. Examples of the crosslinking agent include a multifunctional acrylate compound such as trimethylolpropane tri(meth)acrylate, or pentaerythritol tri(meth)acrylate; an epoxy compound such as glycidyl (meth)acrylate, or ethylene glycol diglycidyl ether; an aziridine compound such as 2,2-bishydroxymethylbutanol-tris [3-(1-aziridinyl) propionate], or 4,4-bis(ethyleneiminocarbonylamino) diphenylmethane; an isocyanate compound such as hexamethylene diisocyanate or biuret type isocyanate; a polyoxazoline compound including an oxazoline group in a side chain; and an alkoxysilane compound such as vinyltrimethoxysilane or N-(2-aminoethyl) 3-aminopropyltrimethoxysilane. In addition, a well-known catalyst can be used in accordance with reactivity of the crosslinking agent, and it is possible to improve the productivity, in addition to the improvement of the film hardness and durability. These may be used singly or in combination of two or more kinds thereof.

The content of the crosslinking agent is preferably 3% to 20% by mass and more preferably 5% to 15% by mass. By setting the content of the crosslinking agent to 3% by mass or more, the effect of improving a crosslinking density can be obtained, and by setting the content of the crosslinking agent 20% by mass or less, a reduction in the stability of the cholesteric liquid crystal layer can be prevented.

The term "(meth)acrylate" is used in the meanings of "either one of or both of acrylate and methacrylate".

(Alignment Control Agent)

An alignment control agent which contributes to stably or rapidly setting the cholesteric liquid crystal layer as a cholesteric liquid crystal layer having planar alignment, may be added into the liquid crystal composition. Examples of the alignment control agent include a fluorine (meth)acrylate-based polymer disclosed in paragraphs [0018] to [0043] of JP2007-272185A, compounds represented by Formulae (I) to (IV) disclosed in paragraphs [0031] to [0034] of JP2012-203237, compounds disclosed in paragraphs [0073] to [0096] of JP2013-076052, compounds disclosed in paragraphs [0011] to [0031] of JP2013-047204, compounds disclosed in JP2013-113913, and the like.

The alignment control agent may be used singly or in combination of two or more kinds thereof.

The amount of the alignment control agent added into the liquid crystal composition is preferably 0.01% to 10% by mass, more preferably 0.01% to 5% by mass, and particularly preferably 0.02% to 1% by mass, with respect to the total mass of the polymerizable liquid crystal compound.

(Other Additives)

In addition, the liquid crystal composition may include at least one kind selected from various additives such as a surfactant for adjusting the surface tension of a coated film and setting an even film thickness, a polymerizable monomer, and the like. Further, a polymerization inhibitor, an antioxidant, an ultraviolet absorber, a light stabilizer, a coloring material, and metal oxide fine particles may be further added into the liquid crystal composition, as necessary, in a range not deteriorating the optical performance.

Regarding the cholesteric liquid crystal layer, a cholesteric liquid crystal layer having fixed cholesteric regularity can be formed by applying a liquid crystal composition obtained by dissolving a polymerizable liquid crystal compound, a polymerization initiator, and as necessary, a chiral agent, and a surfactant in a solvent, onto a support, or an alignment layer which is produced in advance, drying the liquid crystal composition to obtain a coated film, and irradiating this coated film with active light to allow polymerization of the cholesteric liquid crystal composition.

(Solvent)

A solvent used for preparing the liquid crystal composition is not particularly limited, and is appropriately selected according to the purpose, and an organic solvent is preferably used.

The organic solvent is not particularly limited, and is appropriately selected according to the purpose, and examples thereof include ketones, alkyl halides, amides, sulfoxides, heterocyclic compounds, hydrocarbons, esters, and ethers. These may be used singly or in combination of two or more kinds thereof. Among these, ketones are particularly preferable, in a case of considering the load on the environment.

(Coating, Alignment, and Polymerization)

A coating method of the liquid crystal composition onto a support, an alignment layer, and the like is not particularly limited, and can be appropriately selected in accordance with the purpose. Examples of the coating method include wire bar coating, curtain coating, extrusion coating, direct gravure coating, reverse gravure coating, die coating, spin coating, dip coating, spray coating, slide coating, and the like. In addition, the method can also be performed by transferring the liquid crystal composition which is separately applied onto a support.

Liquid crystal molecules are aligned by heating the coated liquid crystal composition. A heating temperature is preferably 200° C. or lower and more preferably 130° C. or lower. By this alignment treatment, an optical thin film in which the polymerizable liquid crystal compound is twist-aligned so as to have a helical axis in a direction substantially perpendicular to a film surface is obtained.

The aligned liquid crystal compound is further polymerized and thereby the liquid crystal composition can be cured. The polymerization may be any of thermal polymerization and photopolymerization using light irradiation, and photopolymerization is preferable. The light irradiation is preferably performed by using ultraviolet light. The irradiation energy is preferably 20 $mJ/cm^2$ to 50 $J/cm^2$ and more preferably 100 to 1500 $mJ/cm^2$.

In order to promote a photopolymerization reaction, the light irradiation may be performed under the heating conditions or the nitrogen atmosphere. The wavelength of ultraviolet light-irradiated is preferably 350 to 430 nm. A high polymerization reaction rate is preferable, and a reaction rate is preferably 70% or greater and more preferably 80% or greater, from a viewpoint of stability. The polymerization reaction rate can be determined by measuring the consumption rate of polymerizable functional groups using an infrared absorption spectrum.

(Alignment Layer)

In a case where the reflective layer is a cholesteric liquid crystal layer, the reflective film may include an alignment layer for aligning the liquid crystal compound as an underlayer coated with the liquid crystal composition during the formation of the cholesteric liquid crystal layer.

The alignment layer may be provided by methods such as a rubbing treatment of an organic compound (resin such as polyimide, polyvinyl alcohol, polyester, polyallylate, polyamideimide, polyetherimide, polyamide, and modified polyamide) such as a polymer, oblique vapor deposition of an inorganic compound, formation of a layer having a microgroove, or accumulation of an organic compound (for example, w-tricosanoic acid, dioctadecyl methyl ammonium chloride, and methyl stearate) by using a Langmuir-Blodgett technique (LB film). Furthermore, a layer that has alignment function generated by applying an electric field, applying a magnetic field, irradiation with light, or the like may be used as the alignment layer.

For example, the alignment layer formed of a polymer is preferably subjected to the rubbing treatment, and the liquid crystal composition is preferably applied onto a surface where rubbing treatment has been performed. The rubbing treatment can be performed by rubbing a surface of a polymer layer in a constant direction with paper or cloth several times.

The liquid crystal composition may be applied to the surface of the support or the surface of the support which is subjected to the rubbing treatment, without providing the alignment layer. In a case of forming a liquid crystal layer by using the temporary support, the alignment layer is peeled off with the temporary support, so that the alignment layer may not be a layer constituting the reflective member.

A thickness of the alignment layer is preferably 0.01 to 5.0 μm, and still more preferably 0.05 to 2.0 μm.

<<Dielectric Multi-Layer Film>>

A dielectric multi-layer film is a known dielectric multilayer film formed by laminating a plurality of dielectric films made of aluminum oxide, magnesium fluoride, zirconium oxide, silicon oxide, or the like. The dielectric multi-layer film has a structure in which a dielectric film with a high refractive index and a dielectric film with a low refractive index are alternately laminated. Thus, the adjustment of a layer structure of the dielectric films enables the dielectric multi-layer film to reflect light in a desired wavelength range and to transmit light in other wavelength range.

A commercially available product can be used as the dielectric multi-layer film, and examples of the commercially available product include H256 manufactured by Shibuya Optical Co., Ltd., and the like.

The reflective film may include various layers that may be included in a reflective film used for a laminated glass, in addition to the support and the reflective layer mentioned above. For example, the reflective film may include a phase retardation layer, a polarization conversion layer, a heat-seal layer (adhesive layer), and the like.

[Method for Producing Laminated Glass]

A method for producing a laminated glass according to an embodiment of the present invention includes disposing the above-mentioned reflective film between two glass plates, and performing a thermocompression bonding treatment on the two glass plates to produce a laminated glass. In the present invention, the laminated glass can be produced by using a known method for producing a laminated glass, except that the above-mentioned reflective film is used.

In most cases, the laminated glass can be manufactured by a method of interposing the intermediate film and the reflective film for a laminated glass between two glass plates, repeating a heating treatment and a pressurizing treatment several times (a treatment with a rubber roller, or the like), and finally performing the heating treatment under a pressurizing condition by using an autoclave.

Hereinafter, the method for producing a laminated glass according to the embodiment of the present invention will be described with reference to the drawings.

As illustrated in FIG. 8, the reflective film 10 and the intermediate film 36 are disposed between a first glass plate 28 and a second glass plate 30, which are curved, and a thermocompression bonding treatment is performed thereon. As a result, as illustrated in FIG. 9, the first glass plate 28, the intermediate film 36, the reflective film 10, and the second glass plate 30 are laminated in this order to produce a curved laminated glass. The produced laminated glass includes the reflective film 10 having cutout portions 11 at side edges, as illustrated in FIG. 10.

In the method for producing a laminated glass, the reflective film 10 and the intermediate film 36 may be thermocompression bonded in advance to form a laminate, and thereafter this laminate may be disposed between the first glass plate 28 and the second glass plate 30, and a thermocompression bonding treatment may be performed thereon to produce a laminated glass.

Figure 11:
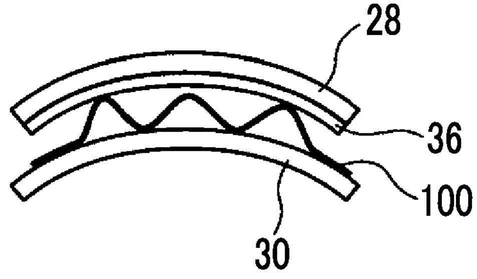
FIG. 11 is a schematic diagram for explaining wrinkles that are generated in a case where a reflective film in the related art is used.
Figure 12:
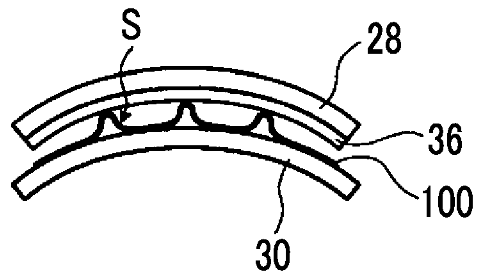
FIG. 12 is a schematic diagram for explaining wrinkles that are generated in a case where a reflective film in the related art is used.
Figure 13:
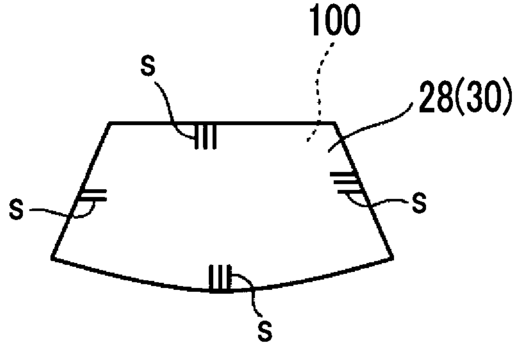
FIG. 13 is a schematic diagram for explaining wrinkles that are generated in a case where a reflective film in the related art is used.

Here, as mentioned above, in a case where the reflective film is disposed between two glass plates, which are curved in a three-dimensional shape, and the two glass plates are thermocompression bonded, the reflective film is planar, while the glass plates have a three-dimensional shape. Therefore, as illustrated in FIG. 11, a surplus portion of a reflective film 100 has been generated with respect to glass plates 28 and 30, and the reflective film 100 cannot follow the curved shape of the glass plates. As a result, there was a problem that, as illustrated in FIG. 12, the surplus portion of the reflective film 100 became wrinkles. As illustrated in FIG. 13, such wrinkles are likely to be generated at end parts of the reflective film 100.

Regarding such wrinkles, in a case of increasing the thermal shrinkage rate of the reflective film, the reflective film shrinks in a plane direction. Therefore, it is possible to prevent the generation of the surplus portion of the reflective film 100; thereby the generation of wrinkles can be prevented. However, in a case of using a reflective film having wavelength-selective reflectivity, which is a property of reflecting light in a specific wavelength range and transmitting light in other wavelength ranges, as the reflective film, the thickness of the reflective film varies in a case where the thermal shrinkage rate of the reflective film is too high, which causes variation in a reflection wavelength range. For this reason, there were problems that a reflectivity at a predetermined wavelength was lowered, and a tint was changed.

Figure 14:
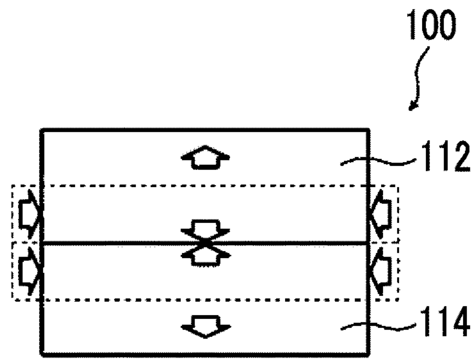
FIG. 14 is a schematic diagram for explaining a change in thickness due to thermal shrinkage of the reflective film.

For example, in a case where the reflective film 100 includes a reflective layer 112 made of a cholesteric liquid crystal layer and a support 114, as illustrated in FIG. 14, the reflective layer 112 shrinks in the plane direction and expands in the thickness direction because the support 114 also shrinks in the plane direction. As mentioned above, although the selective reflection wavelength of the cholesteric liquid crystal layer depends on the pitch of the helical structure of the cholesteric liquid crystalline phase, the pitch of the helical structure also increases in a case where the thickness of the cholesteric liquid crystal layer increases. Therefore, the selective reflection wavelength varies.

In the dielectric multi-layer film, due to the difference in an optical path length, which occurs according to the thicknesses of the high refractive index layer and the low refractive index layer, the phase difference of the reflected light at each layer interface strengthens at a certain wavelength, and cancels out at another wavelength, resulting in weakening each other. Therefore, light at a certain wavelength is reflected, and light at the other wavelength is transmitted. That is, the selective reflection wavelength of the dielectric multi-layer film depends on the thickness of each layer. Therefore, even in a case where the reflective film (reflective layer) is a dielectric multi-layer film, the thickness of each layer increases as the thickness of the dielectric multi-layer film increases, and the selective reflection wavelength varies.

On the other hand, in the method for producing a laminated glass according to the embodiment of the present invention, a reflective film that has an average thermal shrinkage rate of greater than 0.5% and smaller than 2.5% and that has cutout portions on the side edges is used. By setting the thermal shrinkage rate of the reflective film to be greater than 0.5%, the reflective film is shrunk in the plane direction to prevent a surplus portion of the reflective film from being generated, and even in a case where cutout portions are provided on side edges, the surplus portion of the reflective film is prevented from becoming wrinkles; thereby the generation of wrinkles on the end parts of the reflective film can be prevented. In addition, by setting the thermal shrinkage rate of the reflective film to smaller than 2.5%, it is possible to prevent variation in the reflection wavelength range due to variation in the thickness of the reflective film. As a result, it is possible to prevent a decrease in reflectivity at a predetermined wavelength, and it is possible to prevent variation in the tint.

Here, a temperature and pressure applied in a case where the two glass plates are subjected to the thermocompression bonding treatment are the same as a temperature and pressure applied in a method for producing a laminated glass in the related art. The heating temperature is preferably 130° C. to 150° C., more preferably 135° C. to 145° C., and still more preferably 140° C. to 145° C.

In the method for producing a laminated glass using the reflective film according to the embodiment of the present invention, the generation of wrinkles can be more suitably prevented. Therefore, the present invention can be suitably applied even in a case where the maximum curvature depth of the glass plates used for the laminated glass is as large as 15 mm or greater, or 20 mm or greater, or even 30 mm or greater.

The maximum curvature depth is also referred to as a cross-curvature and is an index representing the degree of curvature, and the degree of curvature increases as a value is large. Therefore, wrinkles are likely to be generated in the vicinity of the outer periphery. According to the present invention, it is possible to effectively prevent wrinkles in the vicinity of the outer periphery of the laminated glass having such a large degree of curvature, in particular. Here, the maximum curvature depth (cross-curvature) is a length of a line represented by mm unit, and this line is obtained as follows: the convexly curved laminated glass is arranged so that the convex side faces downward; a straight line is drawn to connect the midpoints of a pair of long sides facing each other, in the laminated glass; a line is drawn perpendicular to the straight line from the deepest point at the bottom of the curved portion to obtain the above-mentioned line.

In addition, the method for producing a laminated glass using the reflective film according to the embodiment of the present invention can also be suitably applied in a case where a part of the reflective film is disposed at a position within 100 mm from each of the edge sides of the glass plates and the thermocompression bonding treatment is performed thereon. Wrinkles are more likely to be generated in the reflective film near the edge sides of the glass plates. By contrast, according to the present invention, wrinkles at the edge sides can be effectively prevented even though a part of the reflective film is disposed at a position within 100 mm from the edge sides of the glass plates.

Figure 15:
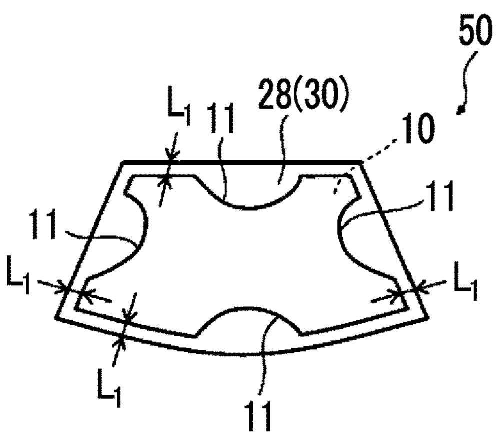
FIG. 15 is a top view schematically illustrating another example of the laminated glass of the present invention.

In addition, the method for producing a laminated glass using the reflective film according to the embodiment of the present invention can be suitably applied to a case in which the reflective film having a shortest distance $L_1$ (see FIG. 15) within 100 mm from one edge side of each of the glass plates to the reflective film on each side of the glass plates is used, and the thermocompression bonding treatment is performed thereon. In other words, the method for producing a laminated glass using the reflective film according to the embodiment of the present invention can be suitably applied even in a case where an area of the reflective film is similar to an area of the glass plate assuming that there is no cutout portion. As the size of the reflective film, that is, as the area of the reflective film is similar to the area of the glass plate assuming that there is no cutout portion, wrinkles are more likely to be generated on the reflective film. By contrast, according to the present invention, it is possible to effectively prevent wrinkles from being generated on the side edges even though the size of the reflective film is similar to the size of the glass plate.

In an example illustrated in FIG. 9, an intermediate film 36 is disposed between the first glass plate 28 and the reflective film 10 and thermocompression bonded as a suitable embodiment, but the present invention is not limited thereto. For example, an intermediate film may be disposed between the second glass plate 30 and the reflective film 10. In addition, a structure in which an adhesive layer is provided between the glass plate and the reflective film may also be adopted.

The thickness of the glass plate is not particularly limited, and may be approximately 0.5 to 5.0 mm and is preferably 1.0 to 3.0 mm and more preferably 2.0 to 2.3 mm. Materials and thicknesses of the first glass plate and the second glass plate may be the same as or different from each other.

In addition, as mentioned above, the maximum curvature depth of the glass plate is preferably 15 mm or greater.

(Intermediate Film)

As the intermediate film (intermediate film sheet), any known intermediate film used as an intermediate film (interlayer) in the laminated glass can be used. For example, a resin film including a resin selected from the group consisting of polyvinylbutyral (PVB), an ethylene-vinyl acetate copolymer, and a chlorine-containing resin can be used. The resin is preferably a main component of the intermediate film. The main component refers to a component occupying 50% by mass or more of the intermediate film.

Among the resins, polyvinylbutyral and an ethylene-vinyl acetate copolymer are preferable, and polyvinylbutyral is more preferable. The resin is preferably a synthesis resin.

Polyvinylbutyral can be obtained by acetalizing polyvinyl alcohol with butylaldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80% to 99.8% by mol is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has good moldability, and the rigidity of the resin film does not become too large. Thus, a good workability is achieved. A more preferable lower limit thereof is 500 and a more preferable upper limit is 2,000.

(Intermediate Film Including Reflective Film)

The intermediate film for the laminated glass including the reflective film can be formed by laminating the reflective film on a surface of the above-mentioned intermediate film. Alternatively, the reflective film may be formed to be sandwiched between the two intermediate films mentioned above. The two intermediate films may be the same as each other or different from each other, and the same intermediate films are preferable.

A well-known bonding method can be used to laminate the reflective film and the intermediate film, and a laminate treatment is preferably used. It is preferable that the laminate treatment is performed under heating and pressurizing conditions to some extent so that the laminate and the intermediate film are not peeled off from each other after processed.

In order to stably perform the laminating, a film surface temperature of a side on which the intermediate film is adhered is preferably 50° C. to 130° C. and more preferably 70° C. to 100° C.

The pressurization is preferably performed at the time of laminating. The pressurizing condition is not limited, but is preferably lower than 2.0 kg/$cm^2$ (smaller than 196 kPa), more preferably 0.5 to 1.8 kg/$cm^2$ (49 kPa to 176 kPa), and still more preferably 0.5 to 1.5 kg/$cm^2$ (49 kPa to 147 kPa).

In a case where the reflective film includes a support, and the reflective film itself is thermal-shrunk, the support may be peeled off at the same time as laminating, immediately after laminating, or immediately before laminating. That is, the reflective film attached to the intermediate film obtained after laminating may not have a support.

An example of a method for producing an intermediate film including the reflective film includes (1) a first step of laminating the reflective film to a surface of a first intermediate film to obtain a first laminate, and (2) a second step of laminating a second intermediate film on a surface opposite to the surface on which the first intermediate film of the reflective film in the first laminate is laminated.

For example, in the first step, the reflective film and the first intermediate film are laminated such that the support and the first intermediate film do not face each other. Next, the support is peeled off from the reflective film. Furthermore, in the second step, the second intermediate film is laminated on the surface from which the support has been peeled off. Thereby, it possible to manufacture the intermediate film including the reflective film having no support. In addition, by using the intermediate film including the reflective film, the laminated glass in which the reflective film does not have the support can be easily produced.

In order to stably peel the support without breakage or the like, the temperature of the support in a case of peeling the support off from the reflective film is preferably 40° C. or higher, and more preferably 40° C. to 60° C.

[Laminated Glass]

The laminated glass according to an embodiment of the present invention includes two glass plates, and a reflective film disposed between the two glass plates.

The reflective film has wavelength-selective reflectivity.

The reflective film has at least one cutout portion on a side edge.

The laminated glass according to the embodiment of the present invention is a laminated glass produced by using the reflective film according to the embodiment of the present invention mentioned above. That is, in the laminated glass according to the embodiment of the present invention, the reflective film has wavelength-selective reflectivity and has cutout portions on side edges.

The laminated glass includes the reflective film disposed between a first glass plate and a second glass plate. In addition, the laminated glass preferably has a configuration in which an intermediate film (intermediate film sheet) is provided at least one of between the first glass plate and the reflective film or between the reflective film and the second glass plate. Furthermore, the laminated glass may have a structure in which an adhesive layer is provided at least one of between the first glass plate and the reflective film or between the reflective film and the second glass plate.

Furthermore, as mentioned in the method for producing a laminated glass, it is preferable that a part of the reflective film is disposed at a position within 100 mm from the edge sides of the glass plates in the laminated glass. Furthermore, the reflective film preferably has a size such that the shortest distance $L_1$ (see FIG. 15) from the edge sides of each glass plate to the reflective film is within 100 mm on each side of the glass plates.

Furthermore, as mentioned above, the laminated glass according to the embodiment of the present invention may have the maximum curvature depth of the two glass plates included in the laminated glass as large as 15 mm or greater, or 20 mm or greater, or even 30 mm or greater.

In an example of the laminated glass used as the windshield glass, the first glass plate is disposed on a side (outside the vehicle) opposite to a side on which an image is seen in the HUD, and the second glass plate is disposed on the side on which an image is seen (inside the vehicle). In the laminated glass according to the embodiment of the present invention, the term "first" and "second" in the first glass plate and the second glass plate have no technical meanings, and are provided for convenience in order to distinguish two glass plates. Therefore, the first glass plate may be disposed inside the vehicle and the second glass plate may be disposed outside the vehicle.

As glass plates such as the first glass plate and the second glass plate, a glass plate generally used in the windshield glass can be used. For example, a glass plate having a visible light transmittance of 80% or smaller such as 73% or 76%, such as green glass having high thermal insulating properties, may be used. Even in a case where a glass plate having a low visible light transmittance is used as mentioned above, a windshield glass having a visible light transmittance of 70% or greater in the reflective film can be produced by using the reflective film of the present invention.

In addition, in a case where the first glass plate and the second glass plate are curved glass, it is preferable that the reflective film and a first curved glass are laminated in this order on a convex surface of a second curved glass on the vehicle interior side.

Hereinafter, a windshield glass and a head-up display (HUD) formed by using the laminated glass including the reflective film according to the embodiment of the present invention will be described below.

[Windshield Glass]

The windshield glass having a projection image display function can be provided using the laminated glass formed by using the reflective film according to the embodiment of the present invention.

The term "windshield glass" means window glass and windshield glass for vehicles such as cars and trains, airplanes, ships, motorcycles, and general vehicles such as playground equipment. The windshield glass is preferably used as a front glass, a windshield, or the like in a forward vehicle in a traveling direction.

There is no limit to the visible light transmittance of the windshield glass, but a higher value is preferable. A visible light transmittance of the windshield glass is preferably 70% or greater, more preferably greater than 70%, still more preferably 75% or greater, and particularly preferably 80% or greater.

The above-mentioned visible light transmittance is preferably satisfied at any position of the windshield glass, and particularly, it is preferable that the above-mentioned visible light transmittance is satisfied at a position where the reflective film is present. Since the reflective film according to the embodiment of the present invention has wavelength-selective reflectivity, the transmittance of visible light outside the selective reflection wavelength range can be increased. Therefore, even though any glass commonly used for a windshield glass is used, a configuration that satisfies the above-mentioned visible light transmittance can be achieved.

The shape of the windshield glass is not limited, and is appropriately determined according to a target on which the windshield glass is disposed. The windshield glass may be, for example, a flat surface or a three-dimensional shape having a curved surface such as a concave surface or a convex surface. In the windshield glass molded for an applicable vehicle, the upward direction during normal use, and surfaces becoming the observer side, the driver side, and the visible side such as the inside of the vehicle can be specified.

The thickness of the reflective film in the windshield glass may be uniform or the thickness may be non-uniform. For example, the windshield glass may have a wedge-shaped cross section and the thickness of the reflective film may be non-uniform as the glass for vehicles described in JP2011-505330A, but the thickness of the reflective film is preferable to be uniform.

The reflective film according to the embodiment of the present invention functions as a HUD combiner. In the HUD, the combiner means an optical member that can display a screen image projected from a projector in a visible manner, and in a case where the combiner is observed from a surface side into which the projection image is incident, information on a surface side opposite to the surface side into which the projection light is incident can be observed at the same time. That is, the combiner functions as an optical path combiner for superimposing and displaying external light and light of a projection image.

The reflective film may be provided on the entire surface of the windshield glass, or may be provided on a part of the windshield glass in a plane direction.

In a case where the reflective film is provided on a part of the windshield glass, the reflective film may be provided at any position on the windshield glass, but the reflective film is preferably provided so that a virtual image is displayed at a position where the image can be easily visible from an observer such as a driver during the use of the HUD. For example, a position where the reflective film is provided on the windshield glass may be determined from the relationship between a position of the driver's seat in the vehicle on which the HUD is mounted and a position where the projector is installed.

In addition, it is preferable that the cutout portions of the reflective film are not provided at a position where an image is visibly displayed in a case where the laminated glass including the reflective film is used as a HUD.

[Head-Up Display (HUD) System]

The windshield glass can be used as a constituting member of the HUD. The HUD preferably includes a projector.

<Projector>

The "projector" is a "device projecting light or a screen image", includes a "device projecting a drawn image", and emits projection light carrying and supporting a screen image to be displayed.

In the HUD, the projector may be disposed so that projection light that carries and supports a screen image to be displayed can be incident into the reflective film in the windshield glass.

In the HUD, the projector includes a drawing device, and preferably displays, as a virtual image by reflection, a screen image (real image) drawn on a small intermediate image screen using a combiner.

A known projector used for the HUD can be used as the projector. In addition, in the projector, an imaging distance of the virtual image, that is, a virtual image formation position is preferably variable.

Examples of a method of changing an imaging distance of a virtual image in the projector include a method in which a surface (screen) on which a screen image is generated is moved (refer to JP2017-21302A), a method in which a plurality of optical paths having different optical path lengths are changed (refer to WO2015/190157A), a method in which the optical path length is changed by inserting and/or moving mirrors, a method in which the focal length is changed by using a compound lens as an imaging lens, a method in which a projector 22 is moved, a method in which a plurality of projectors having different imaging distances of virtual images are changed and used, and a method in which a variable-focal-length lens is used (refer to WO2010/116912A).

The projector may be a projector in which the imaging distance of a virtual image is continuously changeable or a projector in which the imaging distance of a virtual image can be changed at two or three more points.

Herein, the imaging distances of at least two virtual images among virtual images of projection light from the projector are preferably different from each other by 1 m or more. Therefore, in a case where the imaging distance of a virtual image can be continuously changed in the projector, the imaging distance of a virtual image is preferably changeable by 1 m or more. Such a projector is preferably used since the projector can suitably handle the case where the distance of line of sight of a driver is considerably different between driving at a normal speed on the general road and driving at a high speed on the expressway.

(Drawing Device)

The drawing device may itself be a device displaying a screen image or a device emitting light capable of drawing a screen image.

In the drawing device, light from the light source may be adjusted by a drawing method such as an optical modulator, laser luminance modulation unit, optical deflection unit for drawing, or the like. The drawing device includes a light source, and means a device including an optical modulator, laser luminance modulation unit, optical deflection unit for drawing, or the like according to the drawing method.

(Light Source)

The light source is not limited, and known light sources used in projectors, drawing devices, and displays, such as light-emitting diodes (LEDs), organic light-emitting diodes (OLEDs), discharge tubes, and laser light sources, may be used.

Among these, LEDs and discharge tubes are preferred since they are suitable for a light source of a drawing device that emits linear polarization, and LEDs are particularly preferred. As the emission wavelength is not continuous in the visible light region, LEDs are suitable for combination with a combiner in which a linearly polarized light reflection layer exhibiting selective reflectivity in a specific wavelength range is used.

(Drawing Method)

The drawing method can be selected according to a light source to be used, and the like, and is not particularly limited.

Examples of the drawing method include a fluorescent display tube, a liquid crystal display (LCD) method using a liquid crystal, a liquid crystal on silicon (LCOS) method, DLP (Digital Light Processing) (registered trademark) method, a scanning method using a laser, and the like. The drawing method may be a method using a fluorescent display tube integrated with a light source. The LCD method is preferred as the drawing method.

In the LCD method and the LCOS method, light beams having respective colors are modulated and multiplexed by the optical modulator, and a light beam is emitted from a projection lens.

The DLP method is a display system using a digital micromirror device (DMD), in which micromirrors corresponding to the number of pixels are disposed, the drawing is performed and light is emitted from the projection lens.

The scanning method is a method of scanning a screen with light rays and imaging using an afterimage in eyes. For example, the description of JP1995-270711A (JP-H7-270711A) and JP2013-228674A can also be referred to. In the scanning method using the laser, a luminance modulated laser beam having each color of, for example, red light, green light, and blue light may be bundled into one ray of light by a multiplexing optical system or a condenser lens, the scanning may be performed with the ray of light by the optical deflection unit, and the ray of light may be drawn on an intermediate image screen to be described later.

In the scanning method, the luminance modulation of a laser beam having each color of, for example, red light, green light, and blue light may be performed directly by changing an intensity of the light source, or may be performed by an external modulator. Examples of the optical deflection unit include a galvanometer mirror, a combination of a galvanometer mirror and a polygon mirror, and a micro electro mechanical system (MEMS), and among these, MEMS is preferable. As the scanning method, a random scan method, a raster scan method, or the like, and a raster scan method are preferably used. In the raster scan method, the laser beam can be driven, for example, with a resonance frequency in a horizontal direction and with a saw-tooth wave in a vertical direction. Since the scanning method does not require the projection lens, it is easy to miniaturize the device.

Light emitted from the drawing device may be linear polarization or natural light (unpolarization).

In a drawing device using a drawing method of the LCD method or the LCOS method and a drawing device using a laser light source, light emitted from the drawing device is essentially linear polarization. In the case where a drawing device in which the emitted light is linear polarization and includes light beams having a plurality of wavelengths (colors), the polarization directions (transmission axis directions) of light beams at the plurality of wavelengths are preferably the same as each other. Known commercially available drawing devices include a device that has non-uniform polarization directions in wavelength ranges of red light, green light, and blue light included in the emitted light (refer to JP2000-221449A). Specifically, an example is known that the polarization direction of the green light is orthogonal to the polarization direction of the red light and the polarization direction of the blue light.

(Intermediate Image Screen)

As mentioned above, the drawing device may use an intermediate image screen. The "intermediate image screen"

is a screen on which a screen image is drawn. That is, in a case where light emitted from the drawing device is not yet visible as a screen image, the drawing device forms a screen image visible on the intermediate image screen using the light. The screen image drawn on the intermediate image screen may be projected on the combiner by light transmitted through the intermediate image screen, and may be reflected on the intermediate image screen and then projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarization incident on the intermediate image screen are in disorder, and color unevenness or the like is likely to occur in the combiner (reflective film). However, by using a phase difference film having a predetermined phase difference, the problem of generating color unevenness can be reduced.

It is preferable that the intermediate image screen has a function of spreading and transmitting incident rays. This is because an enlarged projection image can be displayed. An example of the intermediate image screen includes a screen composed of a microlens array. The microlens array used in the HUD is described in, for example, JP2012-226303A, JP2010-145745A, and JP2007-523369A.

The projector may include a reflecting mirror which adjusts an optical path of projection light formed by the drawing device.

As the HUD using the windshield glass as the reflective film, descriptions disclosed in JP1990-141720A (JP-H02-141720A), JP1998-096874A (JP-H10-096874A), JP2003-98470A, U.S. Pat. No. 5,013,134A, and JP2006-512622A can be referred to.

The windshield glass is particularly effective for the HUD used in combination with a projector using lasers, LEDs, or organic light-emitting diodes (OLEDs) in which an emission wavelength is not continuous in a visible light region as a light source. This is because, the selective reflection center wavelength of the cholesteric liquid crystal layer can be adjusted in accordance with each emission wavelength. In addition, the windshield glass can also be used for projection of a display such as a liquid crystal display device (LCD) in which display light is polarized.

The incident light emitted from the projector may be incident in any direction of upwards, downwards, rightwards, and leftwards of the windshield glass, and may be determined in accordance with a visible direction. For example, the incident light may be incident at an obliquely incident angle from the bottom during the use.

In addition, the reflective film of the windshield glass may be disposed to reflect the incident light.

As mentioned above, the HUD (projector) may be a projection system in which a virtual image formation position is variable. The virtual image formation position is variable so that the driver can visually confirm the virtual image more comfortably and conveniently.

The virtual image formation position is a position at which the driver of the vehicle can visually confirm a virtual image, and for example, a position positioned 1000 mm or greater away from the front of the windshield glass as seen from a normal driver.

Next, the HUD will be described more specifically with reference to FIG. 16.

Figure 16:
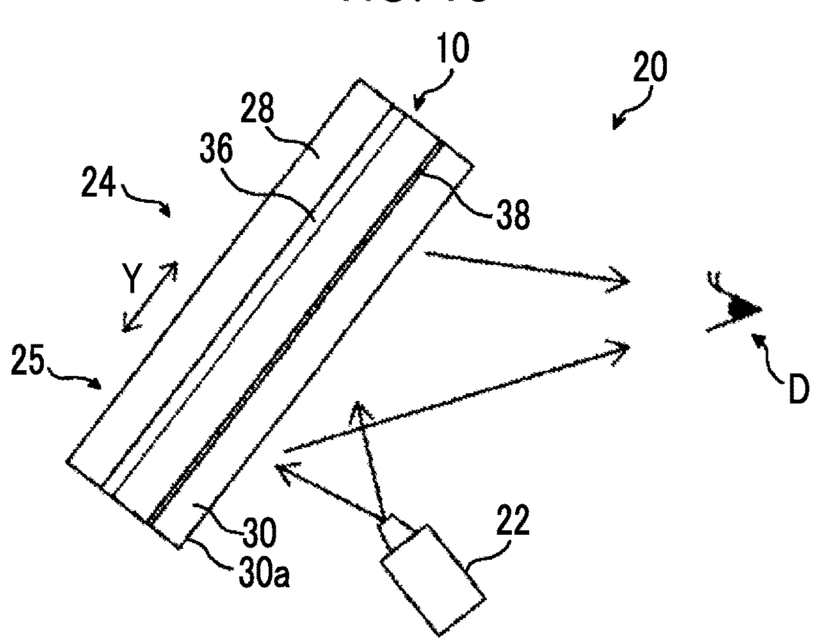
FIG. 16 is a diagram conceptually illustrating an example of a head-up display using the laminated glass of the present invention.

FIG. 16 is a schematic diagram illustrating an example of the head-up display including the reflective film according to the embodiment of the present invention.

The HUD 20 includes a projector 22 and a laminated glass (hereinafter, also referred to as a windshield glass) 24 as a windshield glass, and is used in a vehicle such as a passenger car, for example. Each component in the HUD 20 has already been described.

In the HUD 20, the windshield glass 24 includes the first glass plate 28, the second glass plate 30, the reflective film 10, the intermediate film 36, and an adhesive layer 38, as conceptually illustrated in FIG. 16.

The reflective film 10 is the reflective film 10 illustrated in FIG. 1, has a wavelength-selective reflectivity, and has cutout portions at side edges.

The up and down direction Y of the windshield glass 24 is a direction corresponding to the vertical direction of the vehicle or the like on which the windshield glass 24 is disposed, and is a direction in which the ground side is the lower side and the side opposite to the lower side is the upper side. In the case where the windshield glass 24 is disposed in a vehicle or the like, the windshield glass 24 may be disposed in an inclined manner for the sake of convenience of structure or design, and in this case, the up and down direction Y corresponds to a direction along a surface 25 of the windshield glass 24. The surface 25 is the outer surface side of the vehicle.

The projector 22 has been mentioned above. A known projector used for the HUD can be used as long as the projector 22 can emit the projection light that carries and supports a screen image to be displayed. In addition, in the projector 22, an imaging distance of the virtual image, that is, a virtual image formation position is preferably variable.

In the HUD 20, the projector 22 emits the projection light to the windshield glass 24 (the second glass plate 30).

The windshield glass 24 is a so-called laminated glass and includes the intermediate film 36, the reflective film 10, and the adhesive layer 38 between the first glass plate 28 and the second glass plate 30.

The projection light emitted from the projector 22 is incident on a surface 30*a* of the second glass plate 30. The reflective film 10 has wavelength-selective reflectivity, and the selective reflection wavelength of the reflective film is set to reflect projection light emitted by the projector 22.

The reflective film 10 is attached to the first glass plate 28 via the intermediate film 36, and is attached to the second glass plate 30 via the adhesive layer 38, and is sandwiched between the first glass plate 28 and the second glass plate 30.

In the present invention, the first glass plate 28 and the second glass plate 30 of the windshield glass 24 are basically preferably provided in parallel.

The first glass plate 28 and the second glass plate 30 are both known glass (glass plates) used for windshields of vehicles and the like. Therefore, forming materials, thicknesses, shapes, and the like may be the same as those of glass used for known windshields.

The intermediate film 36 prevents the glass from being broken and scattering in a vehicle in the event of an accident, and furthermore is used to adhere the reflective film 10 to the first glass plate 28. As the intermediate film 36, a known intermediate film (interlayer) used for the windshield of a laminated glass can be used. Examples of the forming materials for the intermediate film 36 include polyvinyl butyral (PVB), ethylene-vinyl acetate copolymer, chlorine-containing resin, polyurethane, and the like.

Further, a thickness of the intermediate film 36 is not limited, and the thickness depending on the forming materials or the like may be set in the same manner as the intermediate film of the known windshield glass.

The adhesive layer 38 is, for example, a layer formed of a coating-type adhesive. The reflective film 10 is attached to the second glass plate 30 using the adhesive layer 38. In the windshield glass of the present invention, the reflective film 10 may be attached to the second glass plate 30 through the intermediate film instead of the adhesive layer 38. In addition, in a case where the reflective film 10 is smaller than the intermediate film 36 to which the first glass plate 28 and the reflective film 10 are attached, the intermediate film 36 may be used to attach the reflective film 10 to the second glass plate 30.

The adhesive layer 38 is not limited as long as the adhesive layer 38 can secure the transparency required for the windshield glass 24 and can attach the reflective film 10 to the glass with the necessary bonding strength, and various known coating-type adhesives are available. The adhesive layer 38 may be the same as the intermediate film 36 such as PVB. In addition thereto, an acrylate-based adhesive or the like can also be used for the adhesive layer 38. As the adhesive layer 38, the same adhesive layer as mentioned above may be used as illustrated below.

The adhesive layer 38 may be formed of the same adhesive used in the above-mentioned adhesive layer.

From the viewpoint of the curing-type, adhesives are classified into hot-melt adhesives, thermosetting adhesives, photo setting adhesives, reaction-setting adhesives, and pressure-sensitive adhesives requiring no curing. In addition, as the adhesives of any type, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, and polyvinylbutyral-based compounds can be used.

From viewpoints of workability and productivity, a photocuring method is preferable as a curing method, and from viewpoints of optical transparency and heat resistance, the acrylate-based, urethane acrylate-based, and epoxy acrylate-based compounds are preferably used as the material.

The adhesive layer 38 may be formed using a highly transparent adhesive transfer tape (OCA tape). A commercially available product for an image display device, in particular, a commercially available product for the surface of the image display portion of an image display device may be used as the highly transparent adhesive transfer tape. Examples of commercially available products include pressure sensitive adhesive sheets (such as PD-S1) manufactured by Panac Co., Ltd., and pressure sensitive adhesive sheets of MHM series manufactured by NICHIEI KAKOH CO., LTD.

The thickness of the adhesive layer 38 is not limited. Therefore, depending on the material for forming the adhesive layer 38, the thickness at which sufficient adhesive force can be obtained may be appropriately set.

Herein, in a case where the adhesive layer 38 is excessively thick, the reflective film 10 may not be attached to the first glass plate 28 or the second glass plate 30 while the planarity is sufficiently maintained. In consideration of this point, the thickness of the adhesive layer 38 is preferably 0.1 to 800 μm, and more preferably 0.5 to 400 μm.

In the windshield glass 24, the adhesive layer 38 is provided between the reflective film 10 and the second glass plate 30, and the reflective film 10 and the first glass plate 28 are attached to each other using the intermediate film 36, but the configuration of the windshield glass 24 is not limited thereto. That is, an adhesive layer may be provided between the reflective film 10 and the first glass plate 28, and an intermediate film may be provided between the reflective film 10 and the second glass plate 30.

In addition, the windshield glass 24 does not have the intermediate film 36, and the adhesive layer 38 may be used to attach the reflective film 10 to the first glass plate 28, and attach the reflective film 10 to the second glass plate 30.

In the HUD 20, the windshield glass 24 includes a configuration in which the reflective film 10 is included between the first glass plate 28 and the second glass plate 30, the reflective film 10 is attached to the second glass plate 30 using the adhesive layer 38, and the reflective film 10 is attached to the first glass plate 28 using the intermediate film 36.

As illustrated in FIG. 16, in the HUD 20, an observer of a screen image, that is, a driver D observes a virtual image of the projection image formed by the projector 22 through projection by the projector 22 and reflection by the windshield glass 24.

The present invention is basically configured as mentioned above. As mentioned above, although the reflective film, the method for producing a laminated glass, and the laminated glass according to the embodiment of the present invention have been described in detail, the present invention is not limited to the above-mentioned embodiments, and various improvements or modifications may also be made without departing from the gist of the present invention.

For example, the reflective film according to the embodiment of the present invention can be incorporated into the laminated glass used as a thermal insulating film by setting the selective reflection wavelength of the reflective film to infrared rays. In a case where the reflective film according to the embodiment of the present invention is used as a thermal insulating film that cuts infrared rays, it is possible to prevent the generation of wrinkles at the end parts of the reflective film during the production of the laminated glass. In addition, it is possible to prevent deterioration of the thermal insulating performance due to variation in the reflection wavelength range of the reflective film.

EXAMPLES

The features of the present invention will be described in detail with reference to the following examples. Materials, reagents, amounts of substances and percentages thereof, and operations illustrated in the following examples can be suitably changed within a range not departing from the gist of the present invention. Therefore, the ranges of the present invention are not limited to the following examples.

Example 1

(Phase Difference Layer-Forming Composition)

The following components were mixed to prepare a phase difference layer-forming composition having the following composition.

| Phase difference layer-forming composition | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.01 parts by mass |
| Polymerization initiator IRGACURE OXE01 (manufactured by BASF SE) | 1.0 part by mass |
| Solvent (methyl ethyl ketone) | the amount of a solute concentration of 20% by mass |

Mixture 1

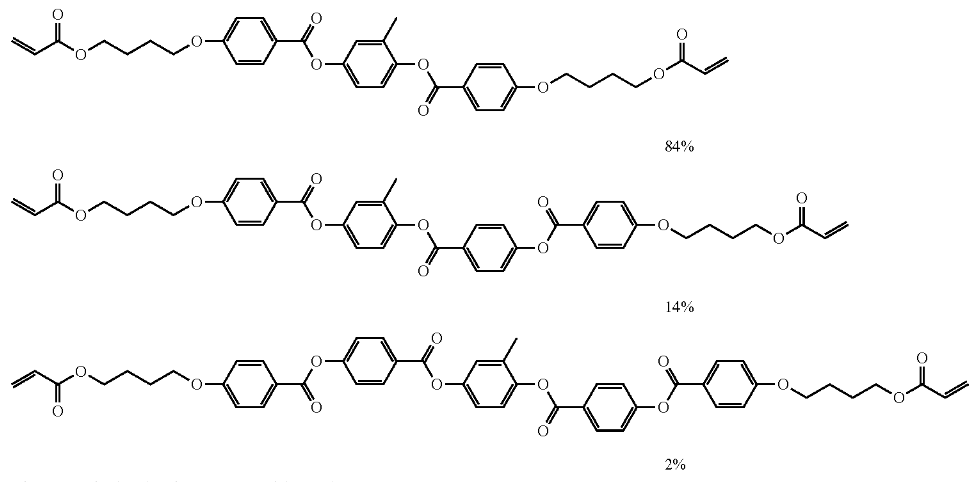

84%

14%

2%

The numerical value is represented by % by mass.

Alignment control agent 1

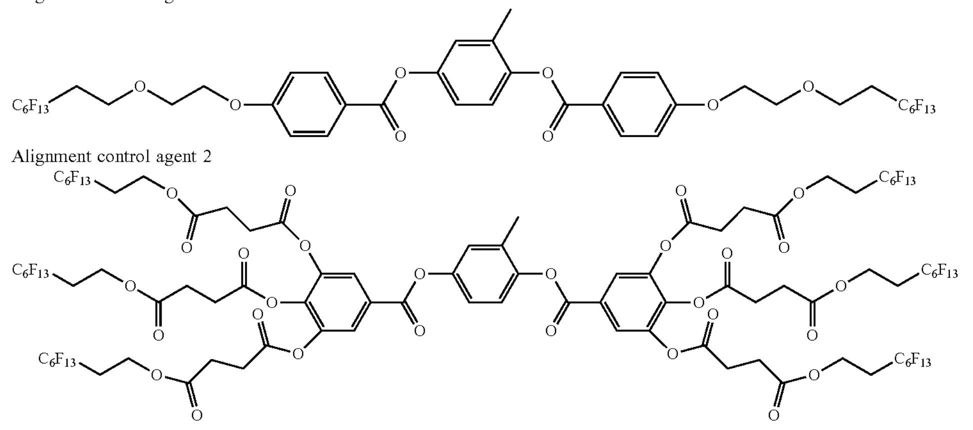

Alignment control agent 2

(Cholesteric Liquid Crystal Layer-Forming Compositions CL1 and CL2)

Regarding a cholesteric liquid crystal layer-forming composition CL1 used to form a cholesteric liquid crystal layer, which has a selective reflection center wavelength of 550 nm, and a cholesteric liquid crystal layer-forming composition CL2 used to form a cholesteric liquid crystal layer, which has a selective reflection center wavelength of 800 nm, the following components were mixed to prepare a cholesteric liquid crystal layer-forming composition having the following composition.

| Cholesteric Liquid Crystal Layer-Forming Composition | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |

-continued

| Cholesteric Liquid Crystal Layer-Forming Composition | |
|---|---|
| Dextrorotatory chiral agent LC756 (manufactured by BASF SE) | adjusted in accordance with the target reflection wavelength |
| Polymerization initiator IRGACURE OXE01 (manufactured by BASF SE) | 1.0 part by mass |
| Solvent (methyl ethyl ketone) | the amount of a solute concentration of 20% by mass |

A single cholesteric liquid crystal layer having a film thickness of 3 μm was produced on a temporary support in the same manner as the production of a reflective film described below using the cholesteric liquid crystal layer-forming composition CL1 and the cholesteric liquid crystal layer-forming composition CL2, and the reflection characteristics of light in the visible light region were confirmed.

As a result, all the produced cholesteric liquid crystal layers were dextrorotatory circularly polarized light-reflective layers, and the selective reflection center wavelength (center wavelength) of the cholesteric liquid crystal layer obtained from the cholesteric liquid crystal layer-forming composition CL1 is a wavelength of 550 nm, and the selective reflection center wavelength of the cholesteric liquid crystal layer obtained from the cholesteric liquid crystal layer-forming composition CL2 is a wavelength of 800 nm.

(Polarization Conversion Layer-Forming Composition)

The following components were mixed to prepare a polarization conversion layer-forming composition having the following composition.

| Polarization Conversion Layer-Forming Composition | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent LC756 (manufactured by BASF SE) | adjusted in accordance with the target number of pitches and the reflection wavelength that matches the film thickness |
| Polymerization initiator IRGACURE OXE01 (manufactured by BASF SE) | 1.0 part by mass |
| Solvent (methyl ethyl ketone) | the amount of a solute concentration of 20% by mass |

In a case where the prescription amount of the dextrorotatory chiral agent LC756 having the composition of the above-mentioned composition was adjusted to obtain the cholesteric liquid crystal layer, the polarization conversion layer-forming composition was prepared to have a desired selective reflection center wavelength λ. The selective reflection center wavelength λ was determined by measuring a single cholesteric liquid crystal layer having a film thickness of 3 μm, which is produced on the temporary support, by FTIR (Spectrum Two manufactured by PerkinElmer Inc.).

The film thickness d of the helical alignment structure can be represented by "the pitch P×the number of pitches of the helical alignment structure". As mentioned above, the pitch P of the helical alignment structure is a length of one pitch in the helical alignment structure, and one pitch is that the director of the liquid crystal compound helically aligned is rotated by 360°. In the cholesteric liquid crystal layer, the selective reflection center wavelength λ coincides with "the length P of one pitch×the average refractive index n in the plane" (λ=P×n). Therefore, the pitch P is "the selective reflection center wavelength λ/the average refractive index n in the plane" (P=λ/n).

Thus, in a case where the cholesteric liquid crystal layer was obtained, the polarization conversion layer-forming composition was prepared so that the selective reflection center wavelength λ was 7000 nm.

<Production of Cellulose Acylate Film>

A cellulose acylate film having a thickness of 40 μm was produced by a production method as in Example 20 described in WO2014/112575A. In addition, by adjusting the stretching conditions, the residual stress was adjusted, and the thermal shrinkage rate was adjusted.

<Saponification of Cellulose Acylate Film>

After passing the produced cellulose acylate film through a dielectric heating roll at a temperature of 60° C. to raise the surface temperature of the film to 40° C., one side of the film was coated with an alkaline solution in the composition provided as below at a coating amount of 14 mL/$m^2$ by using a bar coater and was allowed to stay under a steam-type far infrared heater (manufactured by Noritake Co., Ltd.) heated to 110° C. for 10 seconds.

Next, pure water was applied at 3 mL/$m^2$ by using a bar coater in the same manner.

Next, washing with water using a fountain coater and dewatering using an air knife were repeated three times, staying in a drying zone at 70° C. was performed for 5 seconds, and drying was performed to produce a cellulose acylate film subjected to the saponification treatment.

The in-plane phase difference of the cellulose acylate film was measured by AxoScan and found to be 1 nm.

| Composition of Alkaline Solution | |
|---|---|
| Potassium hydroxide | 4.7 parts by mass |
| Water | 15.7 parts by mass |
| Isopropanol | 64.8 parts by mass |
| Surfactant ($C_{16}H_{33}O(CH_2CH_2O)_{10}H$) | 1.0 part by mass |
| Propylene glycol | 14.9 parts by mass |

<Formation of Alignment Film>

The saponified surface of the saponified cellulose acylate film obtained as mentioned above is coated with an alignment film-forming coating liquid having a composition illustrated below by a wire bar coater at 24 mL/$m^2$, and dried with hot air at 100° C. for 120 seconds to obtain an alignment film having a thickness of 0.5 μm.

| Alignment Film-Forming Coating Liquid | |
|---|---|
| Modified polyvinyl alcohol illustrated below | 28 parts by mass |
| Citric acid ester (AS3, manufactured by Sankyo Chemical Co., Ltd.) | 1.2 parts by mass |
| Photoinitiator (IRGACURE 2959, manufactured by BASF SE) | 0.84 parts by mass |
| Glutaraldehyde | 2.8 parts by mass |
| Water | 699 parts by mass |
| Methanol | 226 parts by mass |

(Modified Polyvinyl Alcohol)

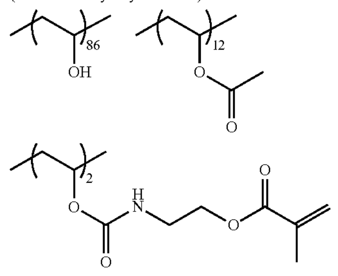

(Production of Reflective Film)

A cellulose acylate film having the produced alignment film was used as a support. Rubbing treatment (rayon cloth, pressure: 0.1 kgf (0.98N), rotation speed: 1000 revolutions per minute (rpm), transport speed: 10 m/min, and the number of times: 1 round trip) was performed on an alignment film surface.

The rubbing treatment was performed with a long side direction H of a temporary support S as a reference, and an angle α between a rubbing direction Sa and the long side direction H was 50° clockwise.

The phase difference layer-forming composition was applied to the surface of the support where rubbing treatment has been performed by using a wire bar, and then dried.

Next, the coated result was placed on a hot plate at 50° C. and irradiated with ultraviolet light for 6 seconds by an electrodeless lamp "D bulb" (60 mW/cm$^2$) manufactured by Fusion UV Systems Inc. in an environment with an oxygen concentration of 1000 ppm or less, and the liquid crystalline phase was fixed. As a result, a phase retardation layer having a desired front phase difference, that is, a phase retardation layer having a thickness adjusted to obtain a desired retardation was obtained.

The retardation of the formed phase difference layer was measured by AxoScan, and the measurement result was 142 nm.

The cholesteric liquid crystal layer-forming composition CL1 is applied to a surface of the phase difference layer at room temperature by using a wire bar so that the thickness of the dry film after drying was 0.55 μm to obtain a coating layer.

The coating layer was dried at room temperature for 30 seconds and then heated in an atmosphere of 85° C. for 2 minutes. Thereafter, in an environment with an oxygen concentration of 1000 ppm or less, a D valve (90 mW/cm$^2$ lamp) manufactured by Fusion Co., Ltd. was used to emit ultraviolet light at 60° C. and 60% output for 6 to 12 seconds to fix the cholesteric liquid crystalline phase, and a cholesteric liquid crystal layer having a thickness of 0.55 μm was obtained. This cholesteric liquid crystal layer is a green-reflecting cholesteric liquid crystal layer that selectively reflects green light.

Next, the same step was repeated by further using the cholesteric liquid crystal layer-forming composition CL2, and a layer that is formed of the cholesteric liquid crystal layer-forming composition CL2 and that has a thickness of 0.80 μm was laminated on the surface of the obtained cholesteric liquid crystal layer. This cholesteric liquid crystal layer is a red-reflecting cholesteric liquid crystal layer that selectively reflects red light.

Next, a polarization conversion layer-forming composition was applied to the surface of the formed cholesteric liquid crystal layer to have a film thickness of 1.7 μm, thereby forming a polarization conversion layer thereon.

The polarization conversion layer was formed in the same manner as the cholesteric liquid crystal layer mentioned above.

As mentioned above, this polarization conversion layer has a selective reflection center wavelength (reflection center wavelength) of 7000 nm in a case assumed as a cholesteric liquid crystal layer.

As mentioned above, a reflective film in which the phase retardation layer, the two cholesteric liquid crystal layers, and the polarization conversion layer were laminated on the substrate was obtained.

This reflective film was cut into a shape in which each side of the reflective film was disposed on 50 mm inside from each side of the first glass plate and the second glass plate used for the laminated glass. That is, the reflective film was cut into a shape similar to that of the first glass and the second glass, each side being about 100 mm shorter.

Here, as the first glass plate and the second glass plate, those having a curved shape for a vehicle windshield (visible light transmittance of 90%) and having a maximum curvature depth of 20 mm were used.

Figure 17:
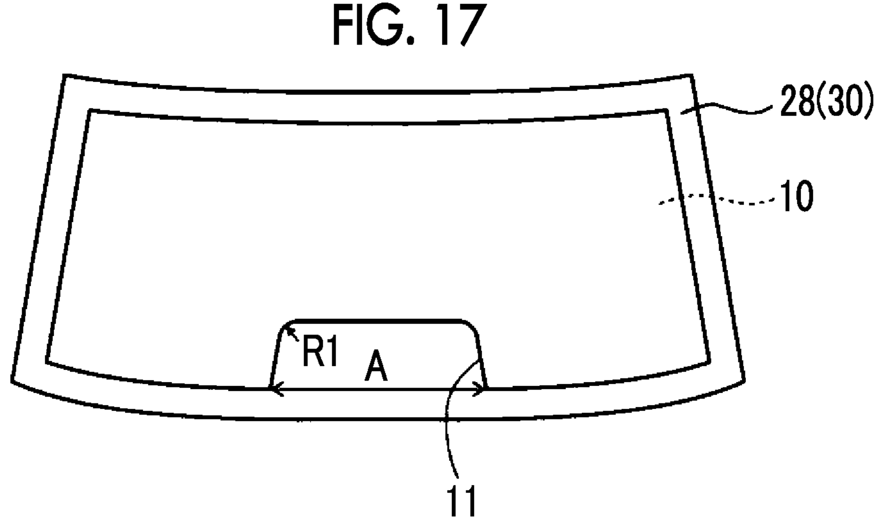
FIG. 17 is a conceptual diagram for explaining the cutout portion of the reflective film in Examples.

Next, in a case where the laminated glass was disposed as a vehicle windshield, a cutout portion was formed in the center of a side of the reflective film that was the lower side in the vertical direction (see FIG. 17). Wrinkles are likely to be generated on the lower side of this reflective film. A width A of the cutout portion was 600 mm, and a depth was 170 mm toward the upper side in the vertical direction. That is, the cutout portion was made into a square shape. In addition, a curvature radius $R_1$ of a corner of the cutout portion was set to 10 mm. Accordingly, the minimum curvature radius of this cutout portion is 10 mm.

As mentioned above, the reflective film according to the embodiment of the present invention was produced.

In the following description, the lower side of the reflective film in the vertical direction in a case where the laminated glass is disposed as a vehicle windshield is simply referred to as a lower side, and the upper side of the reflective film in the vertical direction is also simply referred to as an upper side.

An average thermal shrinkage rate of the produced reflective film after being held at 140° C. for 30 minutes was measured by the method mentioned above, and the measurement result was 0.6%.

Example 2

Lamination and cutting were carried out in the same manner as in Example 1, except that the stretching conditions of the cellulose acylate film were adjusted, to produce a reflective film.

The in-plane phase difference of this cellulose acylate film was measured by AxoScan, and the measurement result was 1 nm. The average thermal shrinkage rate of the reflective film was 1.2%.

Example 3

Figure 18:
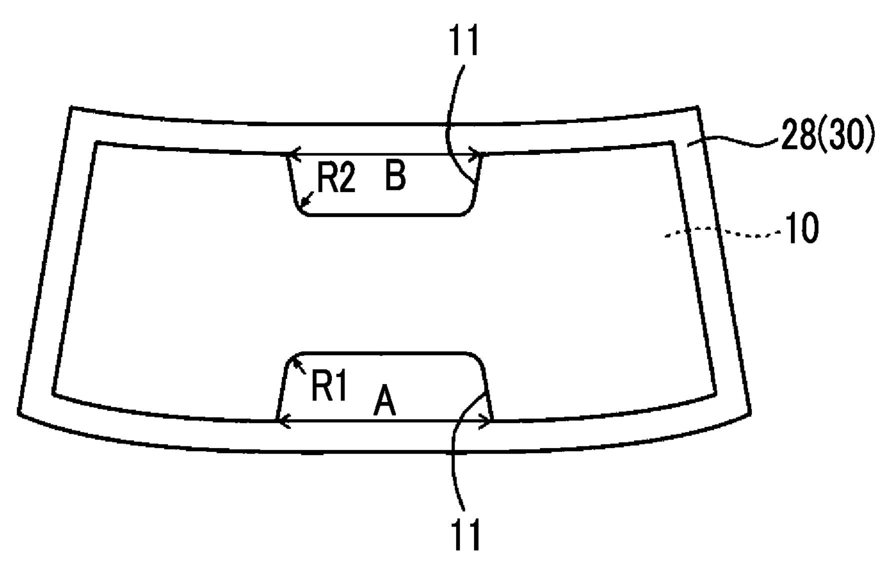
FIG. 18 is a conceptual diagram for explaining the cutout portion of the reflective film in Examples.

Furthermore, as illustrated in FIG. 18, a reflective film was produced in the same manner as in Example 1, except that the reflective film further had a cutout portion formed in the center of the upper side. That is, the reflective film of Example 3 has two cutout portions.

The cutout portion formed in the center of the upper side had a width B of 600 mm and a depth of 170 mm downward in the vertical direction. In addition, a curvature radius $R_2$ of a corner of the cutout portion was set to 10 mm. Accordingly, the minimum curvature radius of this cutout portion is 10 mm.

Example 4

A reflective film was produced in the same manner as in Example 3, except that the curvature radius $R_1$ of the corner of the cutout portion formed in the center of the upper side was 100 mm, and the curvature radius $R_2$ of the corner of the cutout portion formed in the center of the upper side was 100 mm. The minimum curvature radius of the cutout portions in the reflective film of Example 4 was 100 mm.

Example 5

A reflective film was produced in the same manner as in Example 3, except that the curvature radius $R_1$ of the corner of the cutout portion formed in the center of the upper side was 300 mm, and the curvature radius $R_2$ of the corner of the cutout portion formed in the center of the upper side was 300 mm. The minimum curvature radius of the cutout portions in the reflective film of Example 5 was 300 mm.

Example 6

A reflective film was produced in the same manner as in Example 5, except that the following heat-seal layer was formed on a surface of the reflective film opposite to the surface of the support where rubbing treatment has been performed.

The average thermal shrinkage rate of the produced reflective film was 0.6%.

(Formation of Heat-Seal Layer)

The following heat-seal-forming coating solution was applied to the surface opposite to the surface of the support where rubbing treatment has been performed by using a wire bar, and heated at 100° C. for 1 minute to form a heat-seal layer (adhesive layer) having a thickness of 1.0 μm.

(Heat-Seal Layer-Forming Coating Liquid)

The following components were mixed to prepare a heat-seal layer-forming coating liquid.

| Heat-Seal Layer-Forming Coating Liquid | |
|---|---|
| Polyvinyl acetal resin (KS-10, manufactured by Sekisui Chemical Co., Ltd.) | 4.75 parts by mass |
| Inorganic fine particles (AEROSIL RX300, manufactured by Nippon Aerosil Co., Ltd.) 5% MiBK dispersion liquid | 5.00 parts by mass |
| Methanol | 85.75 parts by mass |
| Butanol | 4.50 parts by mass |

As for 5% of MiBK dispersion liquid with inorganic fine particles (AEROSIL RX300 manufactured by Nippon Aerosil Co., Ltd., average primary particle diameter of 7 nm), inorganic fine particles were added to methyl isobutyl ketone (MiBK) so that the concentration of solid contents was 5% by mass, and the mixture was stirred with a magnetic stirrer for 30 minutes. Thereafter, the mixture was subjected to ultrasonic dispersion treatment with an ultrasonic disperser (Ultrasonic Homogenizer UH-600S manufactured by SMT Co., Ltd.) for 10 minutes to produce a dispersion.

A part of the obtained dispersion was sampled for measuring an average secondary particle diameter, the average secondary particle diameter of the silica particles in the dispersion was measured using Microtrac MT3000 (manufactured by MicrotracBEL Corp.), and the measurement result was 190 nm.

Example 7

(Thermal Insulating Layer-Forming Composition)

Components below were mixed to prepare a dextrorotatory circularly polarized light-reflective composition for forming a thermal insulating layer having the following composition.

| Dextrorotatory Circularly Polarized Light-reflective Composition for Forming Thermal Insulating Layer | |
|---|---|
| Mixture 1 | 100 parts by mass |
| Fluoride-based horizontal alignment agent 1 (alignment control agent 1) | 0.05 parts by mass |
| Fluoride-based horizontal alignment agent 2 (alignment control agent 2) | 0.02 parts by mass |
| Dextrorotatory chiral agent LC756 (manufactured by BASF SE) | adjusted in accordance with the target number of pitches and the reflection wavelength that matches the film thickness |
| Polymerization initiator IRGACURE OXE01 (manufactured by BASF SE) | 1.0 part by mass |
| Solvent (methyl ethyl ketone) | the amount of a solute concentration of 20% by mass |

In a case where the prescription amount of the dextrorotatory chiral agent LC756 of the dextrorotatory circularly polarized light-reflective composition for forming the above-mentioned thermal insulating layer was adjusted to obtain a cholesteric liquid crystal layer, a dextrorotatory circularly polarized light-reflective composition for forming a thermal insulating layer was prepared so that the selective reflection center wavelength λ was 1000 nm.

Next, the following components were mixed to prepare a levorotatory circularly polarized light-reflective composition for forming a thermal insulating layer having the following composition.

| Levorotatory Circularly Polarized Light-Reflective Composition for Forming Thermal Insulating Layer | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Levorotatory chiral agent (L1) below: adjusted in accordance with the target number of pitches and the reflection wavelength that matches the film thickness | |
| Polymerization initiator IRGACURE OXE01 (manufactured by BASF SE) | 1.0 part by mass |
| Solvent (methyl ethyl ketone) | the amount of a solute concentration of 20% by mass |

Levorotatory Chiral Agent (L1)

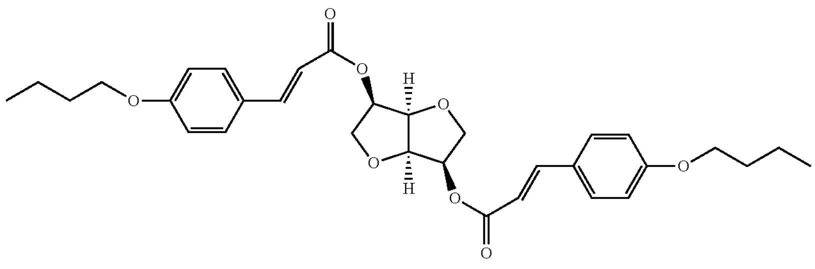 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

In a case where the prescription amount of the levorotatory chiral agent L1 of the levorotatory circularly polarized light-reflective composition for forming the above-mentioned thermal insulating layer was adjusted to obtain a cholesteric liquid crystal layer, a levorotatory circularly polarized light-reflective composition for forming a thermal insulating layer was prepared so that the selective reflection center wavelength λ was 1000 nm.

By using the dextrorotatory circularly polarized light-reflective composition for forming a thermal insulating layer, a single cholesteric liquid crystal layer having a thickness of 3 μm was produced on a substrate in the same manner as in the production of the reflective film described below, and the reflection characteristics were confirmed.

As a result, the produced cholesteric liquid crystal layer was a dextrorotatory circularly polarized light-reflective layer, and the selective reflection center wavelength (center wavelength) was 1000 nm.

In a case where the levorotatory circularly polarized light-reflective composition for forming a thermal insulating layer was used to confirm the reflection characteristics in the same manner, the produced cholesteric liquid crystal layer was a levorotatory circularly polarized light-reflective layer, and the selective reflection center wavelength (center wavelength) was 1000 nm.

In the same manner as in Example 1, the surface of the support where rubbing treatment has been performed was coated with the dextrorotatory circularly polarized light-reflective composition for forming a thermal insulating layer to have a thickness of 5 μm, thereby forming a dextrorotatory circularly polarized light-reflective layer. The dextrorotatory circularly polarized light-reflective layer was formed in the same manner as the formation of the cholesteric liquid crystal layer of Example 1.

Next, a levorotatory circularly polarized light-reflective layer for forming a thermal insulating layer was coated on the dextrorotatory circularly polarized light-reflective layer to have a film thickness of 5 μm, thereby forming a levorotatory circularly polarized light-reflective layer. The levorotatory circularly polarized light-reflective layer was formed in the same manner as the cholesteric liquid crystal layer described above.

As mentioned above, a reflective film in which the dextrorotatory circularly polarized light-reflective layer and the levorotatory circularly polarized light-reflective layer were laminated on the support was produced.

This reflective film was cut into a shape similar to that of Example 5 to produce a reflective film having cutout portions. The average thermal shrinkage rate of the produced reflective film was 0.6%.

Example 8

An $Nb_2O_5$ layer, which was a high refractive index dielectric layer, and a $SiO_2$ layer, which was a low refractive index dielectric layer, were alternately laminated on a cellulose acylate film produced in the same manner as in Example 1 by a magnetron sputtering method as illustrated below to form nine layers, thereby obtaining an infrared reflective film, which was used as an infrared reflective film.

Each $Nb_2O_5$ layer was formed by using an NBO target (manufactured by AGC Ceramic Co., Ltd., trade name: NBO), while introducing a mixed gas in which 5% by volume of oxygen gas is mixed with argon gas by pulse sputtering at a pressure of 0.1 Pa, a frequency of 20 kHz, a power density of 5.1 $W/cm^2$, and an inverted pulse width of 5 μsec.

Each $SiO_2$ layer was formed by using a Si target, while introducing a mixed gas in which 27% by volume of oxygen gas is mixed with argon gas by pulse sputtering at a pressure of 0.3 Pa, a frequency of 20 kHz, a power density of 3.8 $W/cm^2$, and an inverted pulse width of 5 μsec.

A thickness of each of the $Nb_2O_5$ layer and the $SiO_2$ layer was adjusted by changing the film formation time, and the $Nb_2O_5$ layer (95 nm)/$SiO_2$ layer (153 nm)/$Nb_2O_5$ layer (95 nm)/$SiO_2$ layer (153 nm)/$Nb_2O_5$ layer (95 nm)/$SiO_2$ layer (153 nm)/$Nb_2O_5$ layer (95 nm)/$SiO_2$ layer (25 nm)/$Nb_2O_5$ layer (10 nm) were laminated in this order from the support side.

This infrared reflective film was cut into a shape similar to that of Example 5 to obtain a reflective film having cutout portions. The average thermal shrinkage rate of the produced reflective film was 0.6%.

Example 9

A reflective film was produced in the same manner as in Example 3, except that the curvature radius $R_1$ of the corner of the cutout portion formed in the center of the upper side was 90 mm, and the curvature radius $R_2$ of the corner of the cutout portion formed in the center of the upper side was 90 mm. The minimum curvature radius of the cutout portions in the reflective film of Example 9 was 90 mm.

Example 10

A cutout portion formed in the center of the lower side was arc-shaped. The depth D of the cutout portion was set to 170 mm toward the upper side in the vertical direction, and the curvature radius R of the arc was set to 500 mm (see FIG. 7). In addition, the cutout portion formed in the center of the upper side was also arc-shaped. The depth D of the cutout portion was set to 170 mm toward the lower side in the vertical direction, and the curvature radius R of the arc was set to 500 mm. Other than that, a reflective film was produced in the same manner as in Example 3. The minimum curvature radius of the cutout portions in the reflective film of Example 10 was 500 mm.

Example 11

A reflective film was produced in the same manner as in Example 10, except that the curvature radius R of the arc of the cutout portion formed in the center of the upper side was 700 mm, and the curvature radius R of the arc of the cutout portion formed in the center of the upper side was 700 mm. The minimum curvature radius of the cutout portions in the reflective film of Example 11 was 700 mm.

Example 12

A reflective film was produced in the same manner as in Example 10, except that the curvature radius R of the arc of the cutout portion formed in the upper side was 900 mm, and the curvature radius R of the arc of the cutout portion formed in the center of the upper side was 900 mm. The minimum curvature radius of the cutout portions in the reflective film of Example 12 was 900 mm.

Comparative Example 1

A reflective film was produced in the same manner as in Example 1, except that the stretching conditions of the cellulose acylate film were adjusted to change the average thermal shrinkage rate of the reflective film.

The in-plane phase difference of this cellulose acylate film was measured by AxoScan, and the measurement result was 1 nm. The average thermal shrinkage rate of the produced reflective film was 0.4%.

Comparative Example 2

A reflective film was produced in the same manner as in Example 1, except that the stretching conditions of the cellulose acylate film were adjusted to change the average thermal shrinkage rate of the reflective film.

The in-plane phase difference of this cellulose acylate film was measured by AxoScan, and the measurement result was 1 nm. The average thermal shrinkage rate of the produced reflective film was 2.6%.

Comparative Example 3

A reflective film was produced in the same manner as in Example 1, except that no cutout portion was provided.

[Evaluation]

Laminated glasses were produced by using the produced reflective films in the following manner, and the generation of wrinkles, a tint change of reflected light, and appearance were evaluated.

(Production of Laminated Glass)

A glass plate having a thickness of 2 mm (visible light transmittance of 90%) was used to produce two curved glasses to be a vehicle windshield that has a length of 900 mm×a width of 1450 mm, and a maximum curvature depth of 20 mm. The vertical and horizontal dimensions are dimensions of the longest part.

A PVB film that was cut to the same size as the glass plate was placed on one glass plate as an intermediate film having a thickness of 0.38 mm manufactured by Sekisui Chemical Co., Ltd. The produced reflective film was placed on the intermediate film. The reflective film was disposed such that each side was spaced at a distance of 50 mm from each side of the glass plate.

A second glass plate was placed on the upper side of the reflective film.

This laminate was held at 90° C. and 100 kPa (1 atm) or lower for 1 hour, and then heated in an autoclave (manufactured by Kurihara Seisakusho, K.K.) at 140° C. and 1.3 MPa (13 atm) for 30 minutes to remove air bubbles, to obtain a laminated glass.

(Evaluation of Wrinkles)

Figure 19:
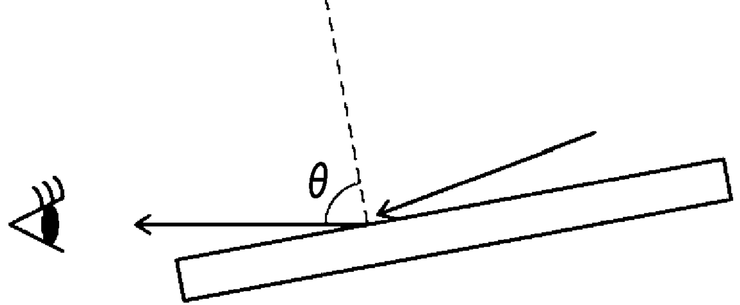
FIG. 19 is a conceptual diagram for explaining an evaluation method in Examples.

Natural light was incident on the laminated glass at an angle θ of 80° as illustrated in FIG. 19, and the presence or absence of the generation of wrinkles was observed by visual observation of the light reflected by the reflective film, and evaluated according to the following criteria.

A: Almost no generation of wrinkles was observed.

B: In a case of observing the laminated glass closely, wrinkles are generated, but are not noticeable.

C: Almost no generation of wrinkles, but some wrinkles are observed.

D: Generation of wrinkles is observed and noticeable in appearance.

(Evaluation of Reflection Tint)

For each produced laminated glass, the reflection tint was observed in the same manner as in the case of the generation of wrinkles, and evaluated according to the following criteria.

A: A tint was uniform over the entire area of the reflective film.

B: Slight unevenness in the tint was observed at the end parts of the reflective film.

(Appearance Evaluation)

As illustrated in FIG. 19, for each produced laminated glass, natural light was incident at an angle θ of 60°, an appearance of the entire laminated glass was visually observed, and an appearance of the boundary between a part on which the reflective film exists and a part on which the reflective film does not exist was evaluated according to the following criteria.

A: The boundary is difficult to be visually recognized due to the cutout portion.

B: Due to the cutout portion, the boundary between the part on which the reflective film exists and a part on which the reflective film does not exist is wide and easily visible, but there is no problem in terms of quality.

The results are illustrated in Table 1.

| | Reflective film | | | | | | | Evaluation | | |
|---|---|---|---|---|---|---|---|---|---|---|
| | Average | Cutout portion | | | Reflective layer | | Heat-seal layer | | | |
| | thermal shrinkage rate | Presence or absence | Number of cutout portions | Curavture radius (mm) | Reflection wavelength range | Kind | Presence or absence | Wrinkles | Reflection tint | Appearance |
| Example 1 | 0.6% | Presence | 1 | 10 | Visible light | Cholesteric liquid crystal layer | Absence | C | A | A |
| Example 2 | 1.2% | Presence | 1 | 10 | Visible light | Cholesteric liquid crystal layer | Absence | C | A | A |
| Example 3 | 0.6% | Presence | 2 | 10 | Visible light | Cholesteric liquid crystal layer | Absence | B | A | A |
| Example 4 | 0.6% | Presence | 2 | 100 | Visible light | Cholesteric liquid crystal layer | Absence | A | A | A |
| Example 5 | 0.6% | Presence | 2 | 300 | Visible light | Cholesteric liquid crystal layer | Absence | A | A | A |
| Example 6 | 0.6% | Presence | 2 | 300 | Visible light | Cholesteric liquid crystal layer | Presence | A | A | A |
| Example 7 | 0.6% | Presence | 2 | 300 | Visible light | Cholesteric liquid crystal layer | Absence | A | A | A |
| Example 8 | 0.6% | Presence | 2 | 300 | Visible light | Dielectric multi-layer film | Absence | A | A | A |
| Example 9 | 0.6% | Presence | 2 | 90 | Visible light | Cholesteric liquid crystal layer | Absence | B | A | A |

-continued

| | Reflective film | | | | | | | | | |
|---|---|---|---|---|---|---|---|---|---|---|
| | Average | Cutout portion | | | Reflective layer | | Heat-seal layer | Evaluation | | |
| | thermal shrinkage rate | Presence or absence | Number of cutout portions | Curavture radius (mm) | Reflection wavelength range | Kind | Presence or absence | Wrinkles | Reflection tint | Appearance |
| Example 10 | 0.6% | Presence | 2 | 500 | Visible light | Cholesteric liquid crystal layer | Absence | A | A | B |
| Example 11 | 0.6% | Presence | 2 | 700 | Visible light | Cholesteric liquid crystal layer | Absence | A | A | B |
| Example 12 | 0.6% | Presence | 2 | 900 | Visible light | Cholesteric liquid crystal layer | Absence | A | A | B |
| Comparative example 1 | 0.4% | Presence | 2 | 300 | Visible light | Cholesteric liquid crystal layer | Absence | D | A | A |
| Comparative example 2 | 2.6% | Presence | 2 | 300 | Visible light | Cholesteric liquid crystal layer | Absence | A | B | A |
| Comparative example 3 | 0.6% | Absence | — | — | Visible light | Cholesteric liquid crystal layer | Absence | D | A | A |

From Table 1, it can be seen that Examples of the present invention can achieve both preventing the wrinkles and preventing a change in the reflection tint as compared to Comparative Examples. On the other hand, in Comparative Example 1, since the average thermal shrinkage rate of the reflective film was low, wrinkles were generated at the end parts of the reflective film. In Comparative Example 2, since the average thermal shrinkage rate of the reflective film was high, the generation of wrinkles could be prevented, but the reflection tint was slightly uneven at the end parts of the reflective film. It is presumed that this is because the reflection characteristics partially changed due to the large shrinkage of the reflective film. Since Comparative Example 3 has no cutout portion, wrinkles were generated.

In Examples 1 and 2, wrinkles were observed at the upper end part of the reflective film, but in Examples 3 to 12, no wrinkles were observed at the upper end part of the reflective film.

In Examples 1 to 3 and 9, wrinkles were observed at the corner of the cutout portion, but in Examples 4 to 8 and 10 to 12, since the minimum curvature radius of the cutout portion was large, no wrinkles were observed on the corner.

It can be seen from Example 6 that wrinkles can be prevented even though the heat-seal layer was provided.

It can be seen from Example 8 that wrinkles can be prevented even though the reflective layer was a dielectric multi-layer film.

In Examples 10 to 12, since the minimum curvature radius of the cutout portion was too large, it is easier to see the boundary between the part on which the reflective film exists and the part on which the reflective film does not exist due to the cutout portion. On the other hand, in Examples 1 to 9, since the minimum curvature radius of the cutout portion was not too large, the boundary portion was difficult to be observed due to the cutout portion.

From the above results, the effect of the present invention is clearly exhibited.

The projection image display member can be suitably used for an in-vehicle head-up display (HUD) system or the like.

EXPLANATION OF REFERENCES

10: Reflective film
11: Cutout portion
12: Reflective layer
14: Support
20: Head-up display (HUD) system
22: Projector
24: Laminated glass (windshield glass)
25, 30*a*: Surface
28: First glass plate
30: Second glass plate
36: Intermediate film
38: Adhesive layer
$D_1$: Depth
R: Curvature radius
$L_1$: Distance
D: Driver (user)
Y: Vertical direction

What is claimed is:

1. A reflective film having wavelength-selective reflectivity, wherein an average thermal shrinkage rate in a case where the reflective film is held at 140° C. for 30 minutes is greater than 0.5% and smaller than 2.5%, the reflective film has at least one cutout portion on a side edge of the reflective film when viewed from a direction perpendicular to a main surface of the reflective film, the cutout portion has a curved portion when viewed from the direction perpendicular to the main surface of the reflective film, and a minimum curvature radius of the curved portion is 100 mm or greater and 900 mm or smaller when viewed from the direction perpendicular to the main surface of the reflective film.

2. The reflective film according to claim 1, wherein the reflective film has a plurality of the cutout portions.

3. The reflective film according to claim 1, wherein the minimum curvature radius of the curved portion is 100 mm or greater and 700 mm or smaller.

4. The reflective film according to claim 1, wherein the minimum curvature radius of the curved portion is 100 mm or greater and 500 mm or smaller.

5. The reflective film according to claim 1, wherein the minimum curvature radius of the curved portion is 100 mm or greater and 300 mm or smaller.

6. The reflective film according to claim 1, wherein a depth D1 of the cutout portion is 10 mm to 250 mm.

7. The reflective film according to claim 1, comprising:

a substrate; and a reflective layer disposed on one main surface side of the substrate.

8. The reflective film according to claim 7, wherein the reflective layer is a cholesteric liquid crystal layer.

9. The reflective film according to claim 8, wherein the reflective layer has a selective reflection center wavelength in a wavelength range from visible light to infrared light.

10. The reflective film according to claim 7, wherein the reflective layer has a selective reflection center wavelength in a wavelength range from visible light to infrared light.

11. The reflective film according to claim 10, wherein the reflective layer has a selective reflection center wavelength in visible light.

12. The reflective film according to claim 7, wherein the reflective layer is two or more cholesteric liquid crystal layers having different selective reflection center wavelengths.

13. A method for producing a laminated glass comprising:

disposing the reflective film according to claim 1 between two glass plates; and performing a thermocompression bonding treatment on the two glass plates to produce a laminated glass.

14. The method for producing a laminated glass according to claim 13, wherein the reflective film is disposed at a position within 100 mm from each of edge sides of the glass plates to perform the thermocompression bonding treatment.

15. The method for producing a laminated glass according to claim 13, wherein each of the two glass plates has a maximum curvature depth of 15 mm or greater.

16. A laminated glass comprising:

two glass plates; and a reflective film disposed between the two glass plates, wherein the reflective film has wavelength-selective reflectivity, the reflective film has at least one cutout portion on a side edge when viewed from a direction perpendicular to a main surface of the reflective film, the cutout portion has a curved portion when viewed from the direction perpendicular to the main surface of the reflective film, and a minimum curvature radius of the curved portion is 100 mm or greater and 900 mm or smaller when viewed from the direction perpendicular to the main surface of the reflective film.

17. The laminated glass according to claim 16, wherein each of the two glass plates has a maximum curvature depth of 15 mm or greater.

* * * * *